United States Patent Office 3,706,738
Patented Dec. 19, 1972

3,706,738
5,6-DIHYDRO-8H-THIOPYRANO[4',3':4,5]THIENO
[2,3-d]PYRIMIDINES
Paul Schmidt and Kurt Eichenberger, Therwil, and Ernst Schweizer, Basel, Switzerland, assignors to Ciba-Geigy Corporation, Summit, N.J.
No Drawing. Continuation-in-part of application Ser. No. 802,248, Feb. 25, 1969. This application Sept. 21, 1970, Ser. No. 74,240
Claims priority, application Switzerland, Feb. 29, 1968, 2,980/68; Aug. 9, 1968, 12,029/68; Jan. 21, 1969, 837/69; Dec. 30, 1969, 19,408/69
Int. Cl. C07d 99/06
U.S. Cl. 260—247.1                22 Claims

ABSTRACT OF THE DISCLOSURE

Compounds of the formula

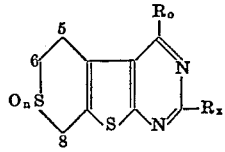

in which $R_o$ stands for an aminoalkylamino group, $R_x$ for an optionally substituted hydrocarbon radical or hydrogen and $n$ stands for 0, 1 or 2, and which contain in at least one of the positions 6 and 8 an aryl radical and which may be further substituted in positions 5, 6 and/or 8 are useful as chemotherapeutic and prophylactic agents against malaria.

CROSS-REFERENCE TO OTHER APPLICATIONS

This is a continuation-in-part application of our copending application Ser. No. 802,248, filed Feb. 25, 1969 (now abandoned).

SUMMARY OF THE DISCLOSURE

The present invention relates to new 5,6-dihydro-8H-thiopyrano[4',3':4,5]thieno[2,3-d]pyrimidines. Especially it concerns 5,6-dihydro-8H-thiopyrano[4',3':4,5]thieno [2,3-d]pyrimidines having the nucleus of formula

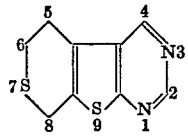

which in at least one of the positions 6 and 8 possess an aryl residue and which in the 4-position possess an amino-lower alkylamino group, as well as their S-oxides and the salts of these compounds.

The terminal amino group of the aminoalkylamino group in the 4-position may be unsubstituted or substituted. A substituted amino group is preferably an aliphatic amino group, that is to say an amino group which is monosubstituted or disubstituted by residues of aliphatic character. Herein residues of aliphatic character are above all aliphatic hydrocarbon radicals. Accordingly the following may be mentioned as substituents of a terminal secondary or tertiary amino group: lower hydrocarbon residues of aliphatic character which may also be interrupted by hetero atoms such as oxygen, sulphur or nitrogen atoms in the carbon chain and/or substituted, for example by hydroxyl groups. Lower hydrocarbon residues of aliphatic character acting as substituents of the terminal amino group are above all the following residues having at most 8 carbon atoms: alkyl, alkenyl or alkylene residues. Residues of this nature interrupted by heteroatoms are above all oxalkylene, aza-alkylene or thia-alkylene residues. As substituents of the terminal amino group there should especially be mentioned methyl, ethyl, allyl, propyl, isopropyl, methallyl, straight-chain or branched butyl, pentyl, hexyl or heptyl residues bonded in any desired position, butylene-(1,4), pentylene-(1,5), hexylene-(1,5), hexylene-(1,6), hexylene-(2,5), heptylene-(1,7), heptylene-(2,7), heptylene-(2,6), 3-oxapentylene-(1,5), 3-thiaphentylene-(1,5), 2,4-dimethyl-3-thiapentylene-(1,5), 3-azapentylene-(1,5), 3-lower-alkyl-3-aza-pentylene-(1,5), such as 3-methyl-3-aza-pentylene-(1,5), 3-(hydroxy-lower alkyl)-3-azapentylene-(1,5), such as 3-(β-hydroxyethyl)-3-aza-pentylene-(1,5), 3-oxahexylene-(1,6) or 3-azahexylene-(1,6) residues.

In the amino-lower alkylamino group in the 4-position the lower alkylene residue which joins the two nitrogen atoms is especially a straight-chain or branched alkylene residue having preferably at most 6 carbon atoms which separates the two nitrogen atoms by 2 to 5, preferably 2 to 3, above all 2, carbon atoms, such as an ethylene-(1,2), propylene-(1,3), butylene-(1,4), pentylene-(1,5), pentylene-(2,5), butylene-(2,4), propylene-(1,2), propylene-(2,3) or butylene-(3,4) residue.

In the aminoalkylamino group mentioned a substituent of the amino group may also be bonded to the alkylene residue which joins the two nitrogen atoms.

The nitrogen atom of the aminoalkylamino group located on the pyrimidine ring is preferably unsubstituted but can however also be substituted, for example by a lower alkyl residue such as one of those mentioned.

The aminoalkylamino group in the 4-position is especially a mono-lower alkylamino-lower alkylamino group or above all a di-lower alkylamino-lower alkylamino group, a pyrrolidino- or piperidino-lower alkylamino group which is optionally C-lower alkylated in the ring and/or β-singly unsaturated in the ring, a piperazino-, N'-lower alkyl-piperazino or N'-(hydroxy-lower alkyl)-piperazino-, the morpholino- or morpholino-lower alkylamino group which is optionally C-lower alkylated in the ring, or an N-lower alkylpyrrolidinyl-2- or -3-lower alkylamino group or N-lower alkylpiperidyl-2-, -3- or -4-lower alkylamino group, it also being possible for the nitrogen atom located on the pyrimidine nucleus to be further substituted by a lower alkyl residue and hence to be tertiary.

The aryl residue in the 6- or 8-position is especially a phenyl residue which may be substituted, for example as specified below for the aryl residues.

Sulphoxides and sulphones, i.e. 7-oxides and 7,7-dioxides, are to be understood by S-oxides.

The new compounds may contain further substituents. Thus they may especially carry further substituents in the 6- and/or 8-position, in addition to the aryl residue already mentioned. Such substituents are for example monofunctional or bifunctional optionally substituted hydrocarbon residues or heterocyclic residues. The following should be particularly mentioned: alkyl residues such as lower alkyl residues, above all those having 1 to 6 carbon atoms such as methyl, ethyl, propyl, isopropyl, straight-chain or branched butyl, pentyl or hexyl residues bonded in any desired position, alkenyl residues such as lower alkenyl residues, for example allyl or methallyl residues, alkylene residues such as straight-chain or branched lower alkylene residues, for example butylene-(1,4), pentylene-(1,5) or hexylene-(1,6) residues, or aryl or aralkyl residues, such as especially phenyl or phenyl-lower alkyl residues, such as benzyl, phenylethyl or phenylpropyl residues, wherein the aromatic parts may also be substituted, or optionally substituted heterocyclic residues which possess one hetero-atom, such as for example pyridyl residues. As substituents of aryl residues or of the aryl part of aralkyl residues there are above all to be mentioned: lower alkyl residues, for example those mentioned, lower alkoxy residues such as methoxy, ethoxy, propoxy or butoxy residues, methylenedioxy groups, halogen atoms such as fluorine, chlorine or bromine atoms, trifluoromethyl groups, hydroxyl groups, nitro groups, amino groups, such as free, mono-lower alkylated or di-lower alkylated amino groups in which the lower alkyl radicals are preferably those mentioned, or acyloxy groups or acylamino groups, wherein the acyl residues are especially those of saturated carboxylic acids having preferably at most 8 carbon atoms, especially lower alkanoic acids such as acetic acid, propionic acid or butyric acid, or phenyl-lower alkanoic acids such as benzoic acids or phenylacetic acids, which may also be substituted, for example as specified above for the aryl residues. Possible substituents of the heterocyclic residues are above all lower alkyl residues, for example those mentioned.

The new compounds preferably contain an aryl residue in each of positions 6 and 8.

In the 5-position, the new compounds may above all possess optionally substituted hydrocarbon residues such as phenyl or phenyl-lower alkyl residues, for example those mentioned, or above all lower alkyl residues, for example those mentioned.

Furthermore the new compounds may also be substituted in the 2-position, above all by optionally substituted hydrocarbon residues such as for example lower alkyl, alkenyl or aralkyl residues, such as for example those mentioned, or cycloalkyl or cycloalkyl-alkyl residues, e.g. optionally lower alkylated, such as methylated, cyclopropyl, cyclopentyl or cyclohexyl residues or cyclopropyl-, cyclopentyl- or cyclohexyl-methyl or -ethyl residues.

The new compounds possess valuable pharmacological properties, above all an anti-bacterial and anti-parasitary action. Thus they especially exhibit an action against plasmodia, for example *Plasmodium berghei*, as is found in animal experiments, for example on peroral administration of 4× 100 to 300 mg./kg. (administered on 4 successive days) to albino mice. The new compounds are also active against strains of plasmodia which are resistant to other anti-malaria agents, as for example primaquine. The new compounds are therefore useful as chemotherapeutics against malaria and also, in particular, as prophylactics against that disease. Furthermore, as has been shown in animal experiments, for example on hamsters, they have an amoebicidal effect and are therefore useful as amoebicides. In addition they possess an anti-inflammatory action. The new compounds are however also valuable intermediates for the manufacture of other useful substances, especially of pharmacologically active compounds.

Compounds to be particularly emphasised are those of the formula

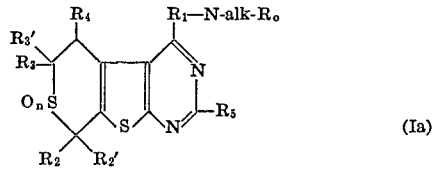

(Ia)

wherein $n$ represents 2, 1 or preferably 0, alk denotes a straight-chain or branched lower alkylene residue which separates $R_0$ from the nitrogen atom in the 4-position by 2 to 5, especially 2 to 3, above all 2 carbon atoms, $R_0$ represents an amino group, especially a mono-lower alkylamino or above all a di-lower alkylamino or a lower alkyleneamino, oxa-alkyleneamino, aza-alkyleneamino or thia-alkyleneamino group, such as a piperidino or pyrrolidino group which is optionally β-singly unsaturated in the ring and/or C-lower alkylated, or an optionally C- lower alkylated morpholino, thiomorpholino, piperazino, N'-lower alkylpiperazine or N'-(hydroxy-lower alkyl)-piperazino group such as N'-methyl- or N'-(β-hydroxyethyl)-piperazino group, $R_1$ denotes a lower alkyl residue or especially a hydrogen atom, $R_2'$ and $R_3'$ denote hydrogen atoms, one of the residues $R_2$ and $R_3$ represents a phenyl residue which is optionally substituted, for example as specified and the other represents a lower alkyl residue, a phenyl-lower alkyl or phenyl residue which is optionally substituted, for example as specified, a pyridyl residue which is optionally substituted, for example as specified, or a hydrogen atom or either $R_2$ and $R_2'$ or $R_3$ and $R_3'$ respectively together represent an optionally lower alkylated pentylene(1,5) or butylene(1,4) residue and one of the other two symbols represents a hydrogen atom and the other a phenyl residue which is optionally substituted, for example as specified, $R_4$ denotes a lower alkyl residue or above all a hydrogen atom and $R_5$ denotes a lower alkyl residue or especially a hydrogen atom.

Of this group of compounds, very special importance attaches to the compounds of the Formula Ia, wherein $n$, $R_0$, $R_4$ and $R_5$ have the significance mentioned, $R_1$, $R_2'$ and $R_3'$ represent hydrogen atoms and $R_2$ and $R_3$, which may be identical or different, represent phenyl residues which are optionally substituted by one, two or more lower alkyl residues, trifluoro methyl groups and/or especially lower alkoxy groups and/or above all halogen atoms, such as for example bromine atoms or especially chlorine atoms (with preferably at least one substituent being in the p-position).

Compounds to be particularly emphasised because of their good anti-malaria action are those of the formula

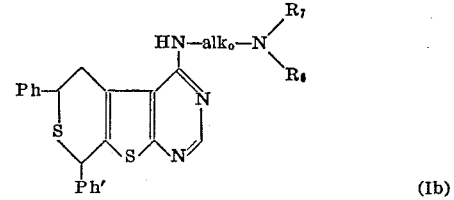

(Ib)

wherein Ph and Ph' represent phenyl residues which are substituted by one, two or more lower alkoxy groups and/or halogen atoms, above all chlorine atoms (preferably in the p-position), alk represents a straight-chain or branched lower alkylene residue which separates the two nitrogen atoms by 2 to 5, especially 2 to 3, above all 2, carbon atoms, and $R_6$ and $R_7$ denote lower alkyl residues, and especially the compounds of the formula

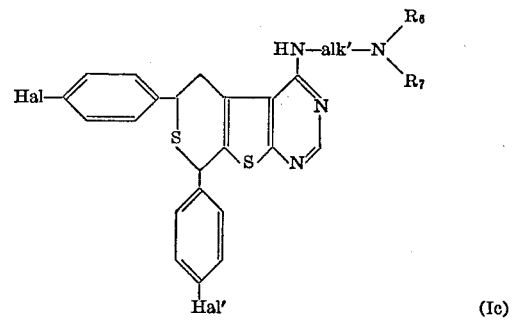

(Ic)

wherein alk' represents a lower alkylene residue having 2 to 3 carbon atoms, especially the 1,3-propylene or preferably the 1,2-ethylene residue, $R_6$ and $R_7$ represent lower alkyl residues, above all methyl or ethyl residues and Hal and Hal' represent fluorine, bromine or especially chlorine atoms, and especially 4-(β-diethylaminoethylamino)-6,8-bis - (p-fluorophenyl) - 5,6 - dihydro-8H-thiopyrano [4',3':4,5]thieno[2,3-d]-pyrimidine and above all cis-4-(β-diethylaminoethylamino) - 6,8 - bis - (p-chlorophenyl)-5,6-dihydro-8H-thiopyrano[4',3':4,5] - thieno[2,3-d]pyrimidine, trans-4 - (β-diethylaminoethylamino)-6,8-bis-(p-chlorophenyl)-5,6-dihydro - 8H - thiopyrano[4',3':4,5]

thieno[2,3-d]pyrimidine and 4 - (β-dimethylamino-ethyl-amino)-6,8-bis-(p-chlorophenyl) - 5,6 - dihydro-8H-thio-pyrano[4′,3′:4,5]thieno[2,3-d]pyrimidine, which for example when administered orally in the form of their dihydrochlorides to albino mice on four successive days at a dose of 100 mg./kg. at a time exhibit a clear anti-malaria action.

Further compounds of importance are those of the formula

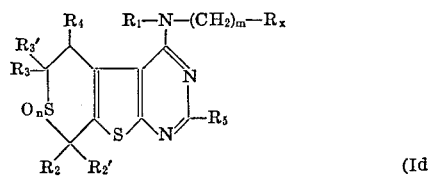

(Id wherein $n$, $R_1$, $R_2$, $R_2'$, $R_3$, $R_3'$, $R_4$ and $R_5$ have the significances specified generally and preferentially above, $m$ represents 1 or 2 and $R_x$ represents an N-lower alkyl-pyrrolidinyl-2 or -3 residue or an N-lower alkyl-piperidinyl-2, -3 or -4 residue.

The new compounds are obtained according to methods which are in themselves known.

The new compounds are obtained according to methods which are in themselves known.

The preferred procedure is to react a 4-Y-5,6-dihydro-8H-thiopyrano[4′,3′:4,5]thieno[2,3-d]pyrimidine, which has an aryl residue in at least one of the positions 6 and 8 and in which Y represents a bromine or especially a chlorine atom, or an S-oxide thereof, with an appropriate amino-lower alkylamine having at least one hydrogen atom on a nitrogen atom.

The reaction is effected in the usual manner, appropriately at eleveated temperature; if desired, an excess of amino-lower alkylamine may be used. The reaction can be effected in the presence or absence of a diluent, optionally in a closed vessel under pressure and/or in an inert gas atmosphere.

The new compounds may also be obtained when a 4-$Y_o$-5,6 - dihydro - 8H - thiopyrano[4′,3′:4,5]thieno[2,3-d] pyrimidine, which has an aryl residue in at least one of the positions 6 and 8 and in which $Y_o$ represents a reactive esterified hydroxy-lower alkylamino group, or an S-oxide thereof is reacted with ammonia or an amine which has at least one hydrogen atom at the nitrogen atom.

A reactive esterified hydroxyl group is therein for example a hydroxyl group esterified with a hydrohalic acid, such as hydrochloric or hydrobromic acid, or with an arylsulphonic acid such as benzenesulphonic, p-bromo-benzenesulphonic or p-toluenesulphonic acid.

The reaction takes place in the usual manner, preferably in the presence of a solvent and advantageously in the presence of a condensation agent such as a basic agent.

The new compounds in which at least one amino group carries at least one hydrogen atom at the nitrogen atom may also be obtained when in a 4-$Y_x$-5,6-dihydro-8H-thiopyranol[4′,3′:4,5]thieno[2,3-d]pyrimidine, which has an aryl residue in at least one of the positions 6 and 8 in which $Y_x$ represents a corresponding amino-lower alkyl-amino group carrying on at least one nitrogen atom an α-aralkyl group, such as a benzyl group, or in an S-oxide thereof, the α-aralkyl group is split off by hydrogenolysis.

The hydrogenolysis is carried out, for example by reduction with catalytically activated hydrogen, such as hydrogen in the presence of a hydrogenation catalyst such as a palladium or platinum catalyst.

The reaction takes place in the usual manner, at ordinary temperature or elevated temperature, advantageously in the presence of solvents and/or diluents.

Substituents may be introduced, converted or split off in the resulting compounds within the framework of the definition of the end substances.

Thus, for example, in resulting 4-(amino-lower alkyl-amino) - 5,6 - dihydro - 8H-thiopyrano[4′,3′:4,5]thieno[2,3-d]pyrimidines which in at least one of the positions 6 and 8 have an aryl residue and which have at least one hydrogen atom at the nitrogen atom in the 4-position or at the nitrogen atom of the terminal amino group of the amino-lower alkylamino group, it is possible to substitute these amino groups, for example by the substituents mentioned for the 4-amino-lower alkylamino group.

The substitution is for example effected by reaction with a reactive ester of a corresponding alcohol or by means of an epoxide. The reactive esters are especially those with hydrohalic acids, such as hydrochloric, hydrobromic or hydriodic acid, sulphuric acid or arylsulphonic acids, such as benzenesulphonic, p-bromobenzenesulphonic or p-toluenesulphonic acid. The reaction takes place in the usual manner, advantageously in the presence of a basic condensation agent.

The substitution of the abovementioned amino groups can however also be effected reductively, for example by reaction with a corresponding oxo compound such as a corresponding aldehyde or ketone, and subsequent or simultaneous reduction of the condensation product thus obtained. The reduction takes place in the usual manner, for example with hydrogen in the presence of a catalyst such as a platinum, palladium or nickel catalyst, or also with formic acid. A Schiff base obtained as the condensation product can also be reduced by means of a di-light metal hydride such as for example an alkali metal-earth metal hydride such as sodium borohydride or lithium aluminium hydride.

The reactions mentioned are effected in the usual manner, advantageously under the conditions known for analogous reactions.

In resulting compounds which contain free hydroxyl groups on an aromatic residue, such hydroxyl groups may be etherified or acylated. The acylation takes place in the usual manner, for example by reaction with a halide, especially the chloride, or an anhydride of a carboxylic acid. The etherification takes place in the usual manner, for example by reaction with an alkyl halide, such as chloride, bromide or iodide, or a dialkyl sulfate, preferably in the presence of a strong base.

In resulting compounds which contain an acylated hydroxyl group, the latter can be split to give the free hydroxyl group. Acylated hydroxyl groups are for example those mentioned above. The splitting off is for example effected hydrolytically, catalysed by acids or bases, for example with sodium hydroxide solution, as appropriate.

In resulting compounds which possess alkoxy residues on an aromatic ring, such residues can be converted into free hydroxyl groups in the usual manner. This conversion is for example effected by hydrolysis, above all by means of strong acids, such as for example hydriodic acid or hydrobromic acid and optionally in the presence of light metal halides such as aluminium bromide or boron bromide, or also with pyridine hydrochloride or aluminium chloride in pyridine.

In resulting compounds which contain aryl residues capable of nitration, the latter may be nitrated. The nitration is effected in a manner which is in itself known, for example by treatment with a mixture of concentrated sulphuric acid and concentrated nitric acid or with the mixed anhydride of nitric acid and a carboxylic acid, for example a lower alkanecarboxylic acid such as acetic acid.

In resulting compounds which contain nitroaryl residues, the latter can be reduced to aminoaryl residues, for example by means of catalytically activated hydrogen such as hydrogen in the presence of a hydrogenation catalyst, for example a platinum, nickel or palladium catalyst, such as platinum oxide, Raney nickel or palladium charcoal.

In resulting acylamino compounds the acyl residues may be split off in the usual manner, for example by hydrolysis, preferably in the presence of acid or basic catalysts.

Resulting S-unsubstituted compounds can be oxidised to the S-oxides (sulphoxides) or S-dioxides (sulphones).

The oxidation to the sulphoxides or sulphones may be effected in a known manner, for example by reaction with an S-oxidising agent such as per-acids such as especially peracetic acid, perbenzoic acids or phthalic-mono-peracids which may be substituted, for example by halogen atoms.

In this reaction the sulphoxides are obtained at lower temperatures, that is to say with good cooling or when using only 1 mol equivalent of the oxidising agent, whilst on warming and/or using at least 2 mol equivalents of the oxidising agent the sulphones are obtained.

Resulting S-oxides can be oxidised to the S-dioxides. This oxidation takes place in a known manner, for example as in the oxidation described above which leads to the dioxides.

These subsequent reactions may be carried out individually or in combination and in any desired sequence.

Depending on the process conditions and starting substances the final substances are obtained in the free form or in the form of their acid addition salts, which is also comprised by the invention. Thus for example basic, neutral or mixed salts, and optionally also hemihydrates, monohydrates, sesquihydrates or polyhydrates thereof, may be obtained. The acid addition salts of the new compounds may be converted to the free compound in a manner which is in itself known, for example by means of basic reagents such as alkalis or ion exchangers. On the other hand the resulting free bases can form salts with organic or inorganic acids. In order to manufacture acid addition salts, acids which are suitable for the formation of therapeutically useable salts are especially used. As such acids there may for example be mentioned: hydrohalic acids, sulphuric acids, phosphoric acids, nitric acid, perchloric acid, aliphatic, alicyclic, aromatic or heterocyclic carboxylic or sulphonic acids such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicylic or p-amino-salicylic acid, embonic acid, methanesulphonic, ethanesulphonic, hydroxyethanesulphonic and ethylenesulphonic acid; halogenobenzenesulphonic, toluenesulphonic, naphthalenesulphonic or sulphanilic acid; methionine, tryptophane, lysine or arginine.

These or other salts of the new compounds, such as for example the picrates, may also serve for the purification of the resulting free bases by converting the free bases into salts, separating these off and again liberating the bases from the salts. In view of the close relation between a free base and a base in the form of salt thereof, whenever a free base is referred to in this context, a corresponding salt is also intended provided such is possible or applicable under the circumstances.

Depending on the choice of the starting substances and procedures the new compounds may be present as optical antipodes, racemates or isomer mixtures (racemate mixtures).

Resulting isomer mixtures (racemate mixtures) may be separated into the two stereoisomeric (diastereomeric) pure isomers (racemates) in a known manner on the basis of the physico-chemical differences of the constituents, for example by chromatography and/or fractional crystallisation.

Resulting racemates can be resolved according to known methods, for example by recrystallisation from an optically active solvent, by means of micro-organisms, or by reaction with an optionally active acid which forms salts with the racemic compound and separation of the salts obtained in this manner, for example on the basis of their differing solubilities, into the diastereomers from which the antipodes can be liberated by the action of suitable agents. Particularly commonly used optically active acids are for example the D- and L-forms of tartaric acid, di-o-toluyltartaric acid, malic acid, mandelic acid, camphorsulphonic acid or quinic acid. The more active of the two antipodes is advantageously isolated.

If isomerisation occurs during a reaction then, if desired, the separation can again be carried out, for example as described above, after the reaction has taken place.

The invention also relates to those embodiments of the process according to which one starts from a compound obtainable as an intermediate at any stage of the process and carries out the remaining process stages or in which a starting substance is formed under the reaction conditions or in which a reaction component is optionally present in the form of its salts.

It is appropriate to use such starting substances for carrying out the reactions according to the invention as lead to the groups of final substances especially mentioned above, and especially to the final substances which have been particularly described or emphasised.

The starting substances are known or may, where they are new, be obtained according to methods which are in themselves known.

Thus for example the 4-chloro- or 4-bromo-5,6-dihydro-8H-thiopyran[4′,3′:4,5]thieno[2,3-d]pyrimidines having an aryl residue in at least one of the positions 6 and 8, which are used as preferred starting materials, or their S-oxides can be obtained by converting the hydroxyl group in a 4-hydroxy-5,6-dihydro - 8H - thiopyrano[4′,3′:4,5] thieno[2,3-d]pyrimidine which in at least one of positions 6 and 8 has an aryl residue, or in an S-oxide thereof, into a chlorine or bromine atom.

The conversion of the hydroxyl group into a chlorine or bromine atom is effected for example by treatment with corresponding halides of sulphur or especially of phosphorus, for example phosphorus pentachloride, phosphorus oxychloride, phosphorus trichloride or corresponding bromides.

The 4 - hydroxy-5,6-dihydro-8H-thiopyrano[4′,3′:4,5] thieno[2,3-d]pyrimidines which in at least one of positions 6 and 8 possess an aryl residue, and their S-oxides can be obtained if a 2-amino-3-Z″-4,5-dihydro-7H-thieno-[2,3-c]thiopyrane which in at least one of positions 5 and 7 has an aryl residue and in which Z″ denotes a free carboxyl group or an esterified carboxyl group such as a carbalkoxy group, or a carbamyl group, or a S-oxide thereof, is reacted with a reactive acid derivative of a carboxylic acid which is capable of pyrimidine ring closure, such as an ester, amide, halide (e.g. chloride), iminoether, anhydride or nitrile with the proviso that at least the residue Z″ or the functionally converted carboxyl group of the carboxylic acid mentioned possesses a nitrogen atom.

The 2 - amino-3-Y″-4,5-dihydro-7H-thieno[2,3-c]thio pyranes which in at least one of positions 5 and 7 possess an aryl residue and wherein Y″ denotes a free or functionally converted carboxyl group, for example a group Z″ or a nitrile group, and their S-oxides can be obtained if a 2,3,5,6-tetrahydrothiopyran-(4)-one which is substituted by an aryl residue in at least one of positions 2 and 6, or an S-oxide thereof is reacted with a compound of the formula Y″—CH$_2$—C≡N in which Y″ has the significance mentioned, and simultaneously or subsequently with sulphur.

The reaction is effected in the usual manner.

Compounds having a free carboxyl group may be obtained in the free form or in the form of their salts with bases, for example salts with organic amines, or metal salts. Possible metal salts are above all alkali metal salts or alkaline earth metal salts such as sodium, potassium, magnesium or calcium salts.

The resolution of the resulting racemate mixtures and/or racemates may be carried out analogously to the procedure described above.

Compounds having basic groups may be obtained in the free form or in the form of their acid addition salts.

The new compounds may for example be used in the form of pharmaceutical preparations in which they are present in the free form or in the form of their salts, especially of the therapeutically acceptable salts, in admixture or conjunction with an organic or inorganic, solid or liquid excipient which is for example suitable for enteral or parenteral administration. Suitable substances for forming the latter are those which do not react with the new compounds, such as for example water, gelatine, lactose, starch, stearyl alcohol, magnesium stearate, talc, vegetable oils, benzyl alcohols, gum, propylene glycols, white petroleum jelly or other known medicinal excipients. The pharmaceutical preparations may for example be in the form of tablets, dragées, capsules or suppositories, or in a liquid form as solutions (for example as an elixir or syrup), suspensions or emulsions. They are optionally sterilised and/or contain auxiliary substances such as preservatives, stabilisers, wetting agents or emulsifiers, solubilising agents or salts for regulating the osmotic pressure or buffers. They may also contain other therapeutically valuable substances. The pharmaceutical preparations are formulated according to usual methods.

The active compounds may also be utilised in the form of feedstuffs or of additives for animal fodder. Herein the usual extenders and diluents or feedstuffs are for example used.

The invention is described in more detail in the following examples.

EXAMPLE 1

5 g. of the stereoisomer, of melting point 199–200° C., of 4-chloro-6,8-diphenyl-5,6-dihydro-8H-thiopyrano[4',3': 4,5]thieno[2,3-d]pyrimidine are warmed for 3 hours with 50 ml. of β-diethylamino-ethylamine in an oil bath at 120° C. The mixture is thereafter evaporated to dryness in vacuo and the residue dissolved in 300 ml. of 0.5 N hydrochloric acid with slight warming. The filtered solution is adjusted to a pH-value of 8–9 with 2 N sodium hydroxide solution, whereupon a precipitate separates out which is filtered off, washed with water and thereafter recrystallised from ethanol. A mixture of the cis- and trans-forms of 4-(β-diethylamino-ethylamino)-6,8-diphenyl-5,6-dihydro - 8H - thiopyrano[4',3':4,5]thieno[2,3-d]pyrimidine of formula

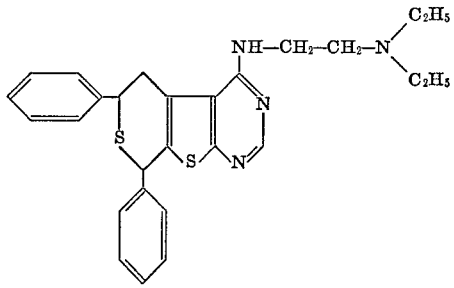

is thus obtained in the form of white crystals of melting point 155–160° C.

Fractional crystallisation of this product from ethanol yields the two stereoisomers in the pure form. They melt at 171–172° C. and 161–162° C.

On dissolving the base of melting point 171–172° C. in the calculated quantity of 1 N alcoholic hydrochloric acid and adding isopropyl ether until crystallisation results, the dihydrochloride of melting point 167–170° C. is obtained. Starting from the base of melting point 161–162° C., a dihydrochloride of melting point 228–231° C. (with decomposition) is obtained analogously.

In an analogous manner, the stereoisomer of melting point 200–201° C. of 4-chloro-6,8-diphenyl-5,6-dihydro-8H - thiopyrano[4',3':4,5]thieno[2,3-d]pyrimidine yields a mixture of the stereoisomers of 4-(β-diethylamino-ethylamino) - 6,8 - diphenyl - 5,6 - dihydro - 8H - thiopyrano[4',3':4,5]thieno[2,3-d]pyrimidine in the form of white crystals of melting point 155–160° C.

The 4 - chloro-6,8-diphenyl-5,6-dihydro-8H-thiopyrano[4',3':4,5]thieno[2,3-d]pyrimidine used as the starting material may for example be obtained as follows:

13.4 g. of 2,6-diphenyl-2,3,5,6-tetrahydro-thiopyran-4-one, 5.65 g. of ethyl cyanoacetate, 1.6 g. of powdered sulphur and 5 ml. of morpholine are suspended in 50 ml. of absolute ethanol and stirred for 2 hours in a bath at 45° C. After allowing the mixture to stand for about 16 hours, the precipitated reaction product is filtered off and washed with ethanol. A mixture of the cis- and trans-forms of 2-amino-3-carbethoxy-5,7-diphenyl-4,5-dihydro-7H-thieno[2,3-c]thiopyrane is thus obtained and this, after recrystallisation from a large quantity of absolute ethanol, forms yellowish crystals of melting point 212–214° C.

10 g. of a mixture of cis- and trans-2-amino-3-carbethoxy-5,7-diphenyl-4,5-dihydro - 7H - thieno[2,3-c]thiopyrane are heated with 50 ml. of formamide for 4 hours under nitrogen whilst stirring, in an oil bath at 180–190° C. After cooling the resulting precipitate is filtered off and washed with ethanol. In order to purify it, the resulting product is dissolved hot in 3 parts by volume of dimethylformamide, clarified with active charcoal and caused to crystallise by adding 9 parts by volume of ethanol. A mixture of the cis- and trans-forms of 4-hydroxy-6,8-diphenyl - 5,6 - dihydro - 8H - thiopyrano[4',3':4,5]thieno[2,3-d]pyrimidine of melting point 220–225° C. is thus obtained.

5 g. of a mixture of cis- and trans-4-hydroxy-6,8-diphenyl - 5,6 - dihydro - 8H - thiopyrano[4',3':4,5]thieno[2,3-d]pyrimidine are warmed with 50 ml. of phosphorus oxychloride for 2 hours in an oil bath at 120° C. Thereafter the excess phosphorus oxychloride is evaporated off in vacuo and the residue is treated with ice water whilst cooling, so that it solidifies. The resulting product is filtered off, washed with water and then triturated with ethanol and filtered off. On fractional recrystallisation from benzene, the two stereoisomers of 4-chloro-6,8-diphenyl - 5,6 - dihydro - 8H - thiopyrano[4',3':4,5]thieno-[2,3-d]pyrimidine may be separated from one another. One form melts at melting point 199–200° C. and the other at 200–201° C.

EXAMPLE 2

3 g. of the stereoisomer of melting point 199–200° C. of 4-chloro-6,8-diphenyl-5,6-dihydro - 8H - thiopyrano[4',3':4,5]thieno[2,3-d]pyrimidine are warmed with 20 ml. of 4-amino-1-(diethylamino)-pentane for 3 hours in an oil bath at 120° C. The reaction solution is poured into 300 ml. of water and the resulting precipitate is filtered off. The resulting product is dissolved in 100 ml. of 0.5 N hydrochloric acid and the filtered solution is adjusted to a pH-value of 8–9 with 2 N sodium hydroxide solution, whereupon a solid precipitate separates out and is filtered off and washed with water. On recrystallisation from isopropyl ether, a mixture of the stereoisomeric forms of 4-(4-diethylamino-1-methyl-butylamino)-6,8-diphenyl - 5,6 - dihydro - 8H - thiopyrano[4',3':4,5]thieno-[2,3-d]pyrimidine of formula

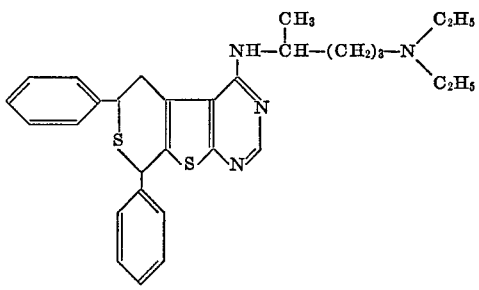

is obtained in the form of white crystals of melting point 128–134° C. The dihydrochloride manufactured therefrom melts at 210–220° C. (with decomposition).

EXAMPLE 3

5 g. of the stereoisomer of melting point 186–188° C. of 4-chloro-6,8-bis-(p-chlorophenyl) - 5,6 - dihydro-8H-thiopyrano[4′,3′:4,5]thieno[2,3-d]pyrimidine are warmed with 50 ml. of β-diethylamino-ethylamine for 3 hours in an oil bath at 120° C. The mixture is thereafter evaporated to dryness in vacuo and the residue triturated with water. Recrystallisation of the resulting product from benzene yields a mixture of the cis- and trans-forms of 4-(β-diethylamino-ethylamino) - 6,8 - bis - (p-chlorophenyl)-5,6 - dihydro - 8H - thiopyrano[4′,3′:4,5]thieno[2,3-d] pyrimidine of formula

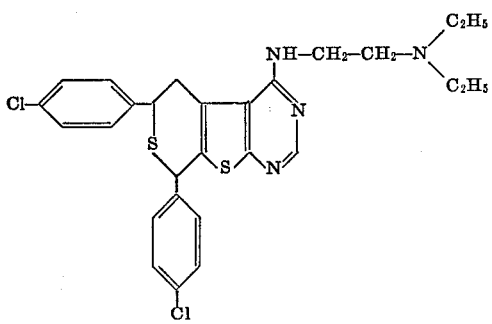

of melting point 200–205° C.

Fractional crystallisation from ethanol yields the stereoisomers of 4 - (β - diethylamino-ethylamino)-6,8-bis-(p-chlorophenyl)-5,6-dihydro - 8H - thiopyrano[4′,3′:4,5] thieno[2,3-d]pyrimidine of formula

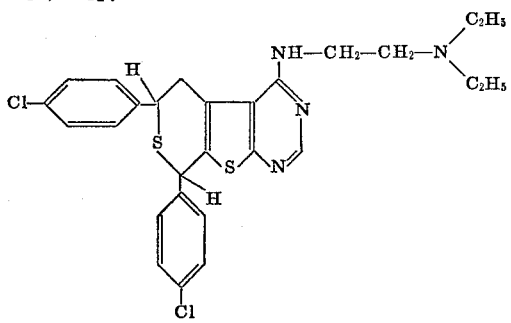

in the pure form, of melting point 220–222° C. and 204–205° C.

In an analogous manner, the stereoisomer of melting point 201–202° C. of 4-chloro-6,8-bis-(p-chlorophenyl)-5,6 - dihydro - 8H - thiopyrano[4′,3′:4,5]thieno[2,3 - d] pyrimidine yields a mixture of the stereoisomers of 4-(β-diethyl-amino - ethyl - amino) - 6,8 - bis - (p - chlorophenyl)-5,6-dihydro - 8H - thiopyrano[4′,3′:4,5] - thieno [2,3-d]pyrimidine of melting point 200–205° C.

On dissolving this mixture of the stereoisomeric bases in the calculated quantity of 1 N alcoholic hydrochloric acid and adding isopropyl ether until crystallisation results, a mixture of the corresponding dihydrochlorides of melting point 230° C. (with decomposition) may be obtained.

In an analogous manner, the base of melting point 220–222° C. yields a dihydrochloride of melting point 235–239° C. (with decomposition) and the base of melting point 204–205° C. yields a dihydrochloride of melting point 244–248° C.

The 4-chloro-6,8-bis-(p-chlorophenyl)-5,6-dihydro-8H-thiopyrano[4′,3′:4,5]thieno[2,3-d]pyrimidine used as the starting product may for example be manufactured as follows:

16.85 g. of 2,6-bis-(p-chlorophenyl)-2,3,5,6-tetrahydro-thiopyran-4-one, 5.65 g. of ethyl cyanoacetate, 1.6 g. of powdered sulphur and 5 ml. of morpholine are suspended in 50 ml. of absolute ethanol and stirred for 2 hours in a bath at 45° C. and thereafter for a further 4 hours at room temperature. The precipitated reaction product is filtered off, triturated with ethanol and again filtered off. A mixture of the cis- and trans-form of 2-amino-3-carbethoxy-5,7-bis-(p-chlorophenyl) - 4,5 - dihydro - 7H-thieno[2,3-c]thiopyrane is thus obtained and this, when recrystallised from absolute ethanol, has a melting point of 90–100° C. and forms yellowish crystals.

10 g. of the mixture of cis- and trans-2-amino-3-carbethoxy-5,7-bis-(p-chlorophenyl)-4,5-dihydro-7H - thieno-[2,3-c]thiopyrane are heated for 4 hours under nitrogen with 50 ml. of formamide whilst stirring, in an oil bath at 180–190° C. After cooling, the resulting precipitate is filtered off and thoroughly washed with ethanol. In order to purify it, the resulting product is dissolved hot in 2 parts by volume of dimethylformamide, clarified with active charcoal, and caused to crystallise by adding 6 parts by volume of ethanol. A mixture of the cis- and trans-forms of 4-hydroxy-6,8-bis-(p-chlorophenyl)-5,6-dihydro-8H-thiopyrano[4′,3′:4,5]thieno[2,3 - d] pyrimidine melting point 260° C. is thus obtained.

5 g. of cis- and trans-4-hydroxy-6,8-bis-(p-chlorophenyl) - 4,6 - dihydro - 8H - thiopyrano[4′,3′:4,5]thieno [2,3-d] pyrimidine are warmed for 2 hours with 50 ml. of phosphorus oxychloride in an oil bath at 120° C. Thereafter the excess phosphorus oxychloride is evaporated off in vacuo and the residue is mixed with ice water whilst cooling. The solid precipitate thus obtained is filtered off, triturated with ethanol and again filtered off. Fractional crystallisation of the resulting product from benzene allows the two stereoisomers of 4-chloro-6,8-bis-(p - chlorophenyl) - 5,6 - dihydro - 8H - thiopyrano [4′,3′:4,5]thieno[2,3-d]pyrimidine to be separated. One form melts at 186–188° C. and the other at melting point 201–202° C.

EXAMPLE 4

3 g. of the stereoisomer of melting point 186–188° C. of 4-chloro-6,8-bis-(p-chlorophenyl)-5,6-dihydro-8H-thiopyrano [4′,3′:4,5]thieno[2,3-d]pyrimidine are warmed for 3 hours with 20 ml. of 4-amino-1-(diethylamino)-pentane in an oil bath at 120° C. The reaction solution is poured into 300 ml. of water, whereupon a semi-solid precipitate forms which is separated off and dissolved in 100 ml. of 0.5 N hydrochloric acid. The filtered hydrochloric acid solution is adjusted to a pH-value of 8–9 with 2 N sodium hydroxide solution and thereafter extracted with ether. After drying the ether solution and evaporating the ether, a solid residue is obtained which is recrystallised from isopropyl ether. A mixture of the stereoisomeric forms of 4-(4-diethylamino-1-methyl-butylamino)-6,8-bis-(p-chlorophenyl)5,6-dihydro-8H - thiopyrano[4′,3′:5,5] thieno[2,3-d]pyrimidine of formula

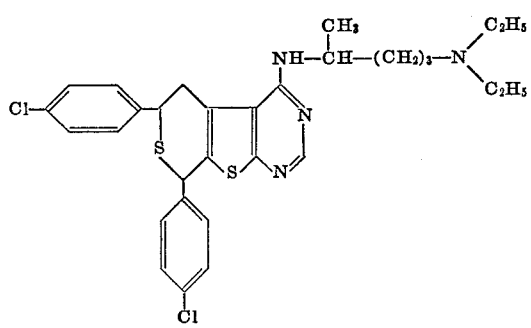

melting point 100–140° C., is thus obtained.

The hydrochloride manufactured therefrom melts at 200–215° C. (with decomposition).

In an analogous manner, the stereoisomer of melting point 201–202° C. of 4-chloro-6,8-bis-(p-chlorophenyl)-5,6 - dihydro - 8H - thiopyrano[4',3':4,5]thieno[2,3 - d]pyrimidine yields a mixture of the stereoisomers of 4-(4-diethylamino-1-methyl-butylamino)-6,8-bis - (p - chlorophenyl)-5,6-dihydro - 8H - thiopyrano[4',3':4,5]thieno[2,3-d]pyrimidine of melting point 100–140° C.

EXAMPLE 5

4.6 g. of the stereoisomer of melting point 186–188° C. of 4-chloro-6,8-bis-(p-chlorophenyl)-5,6-dihydro-8H-thiopyrano[4',3':4,5]thieno[2,3 - d]pyrimidine are dissolved warm in 150 ml. of absolute toluene and heated to boiling for 3 hours with 2.8 g. of γ-diethylamino-propylamine, whilst stirring. The mixture is thereafter evaporated to dryness in vacuo and the residue is triturated with water. Recrystallisation of the resulting product from ethanol yields the pure stereoisomer of melting point 173–174° C. of 4-(γ-diethylamino-propylamino)-6,8-bis - (p - chlorophenyl)-5,6-dihydro - 8H - thiopyrano[4',3':4,5]-thieno[2,3-d]pyrimidine of formula

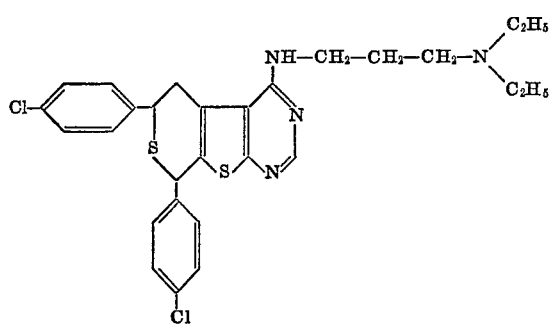

in the form of white crystals.

On dissolving the base in the calculated quantity of 1 N ethanolic hydrochloric acid and adding isopropyl ether until crystallisation results, the dihydrochloride of melting point 180° C. (with decomposition) is obtained.

EXAMPLE 6

4.6 g. of the stereoisomer of melting point 186–188° C. of 4-chloro-6,8-bis-(p-chlorophenyl)-5,6-dihydro-8H-thiopyrano[4',3':4,5]thieno[2,3-d]pyrimidine are dissolved warm in 150 ml. of absolute toluene and heated for 3 hours to boiling, with the addition of 2.2 g. of β-dimethylaminoethylamine, whilst stirring. The mixture is thereafter evaporated to dryness in vacuo and the residue triturated with water. The recrystallisation of the resulting product from ethanol yields the pure stereoisomer of melting point 208–209° C. of 4-(β-dimethylamino-ethylamino) - 6,8 - bis-(p-chlorophenyl)-5,6-dihydro-8H-thiopyrano[4',3':4,5]thieno[2,3-d]pyrimidine of formula

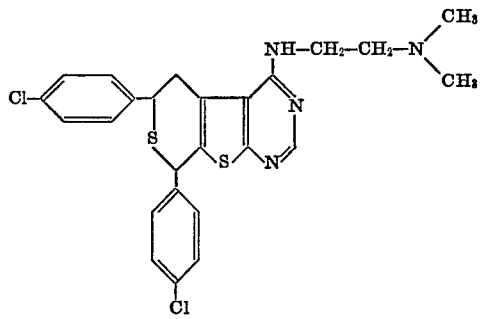

in the form of white crystals.

On dissolving the base in the calculated quantity of 1 N ethanolic hydrochloric acid and adding isopropyl ether until crystallisation results, the dihydrochloride of melting point 260–262° C. is obtained. The bis-methanesulfonate melts at 155° C.

The dihydrochloride of the other isomer (trans-form) which can be prepared in an analogous manner starting from the trans-isomer melts at 258–260° C.

EXAMPLE 7

4.6 g. of the stereoisomer of melting point 186–188° C. of 4 - chloro-6,8-bis-(p-chlorophenyl)-5,6-dihydro-8H-thiopyrano[4',3':4,5]thieno[2,3-d]pyrimidine are dissolved warm in 150 ml. of absolute toluene and heated to boiling with 4.0 g. of γ-dibutylamino-propylamine for 3 hours, whilst stirring. The mixture is thereafter evaporated to dryness in vacuo and the residue triturated with water. Recrystallisation of the resulting product from ethanol yields the pure stereoisomer of melting point 183–184° C. of 4 - (γ-dibutylamino-propylamino) - 6,8-bis-(p-chlorophenyl) - 5,6 - dihydro - 8H-thiopyrano[4',3':4,5]thieno[2,3-d]pyrimidine of formula

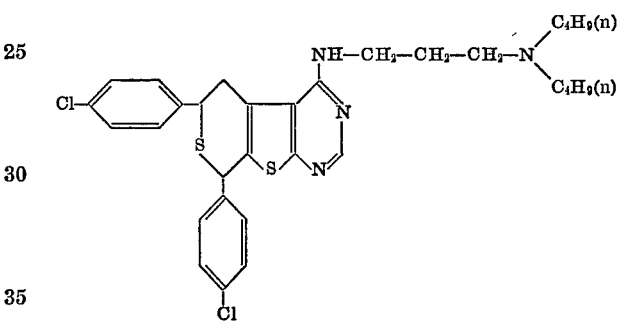

in the form of white crystals.

EXAMPLE 8

4.6 g. of the stereoisomer of melting point 201–202° C. of 4-chloro-6,8-bis-(p-chlorophenyl)-5,6-dihydro-8H-thiopyrano[4',3':4,5]pyrimidine are dissolved warm in 150 ml. of absolute toluene and heated for 3 hours to boiling with 3.5 g. of N-(β-diethylaminoethyl)-ethylamine, whilst stirring. Thereafter the mixture is evaporated to dryness in vacuo. The residue is triturated with water and allowed to stand until it solidifies. On recrystallisation from isopropyl ether-petroleum ether, it yields one stereoisomer of 4-[N-(β-diethylamino-ethyl)-ethylamino] - 6,8 - bis - (p-chlorophenyl) - 5,6 - dihydro-8H-thiopyrano[4',3':4,5]thieno[2,3-d]pyrimidine of formula

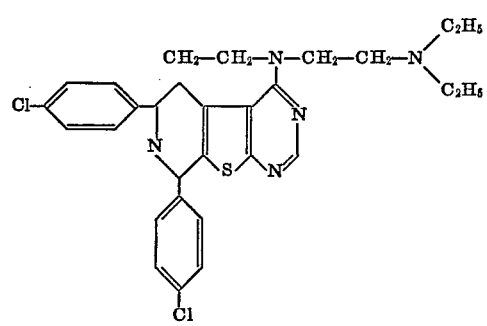

in the form of white crystals of melting point 115–117° C.

EXAMPLE 9

2.5 g. of 4-chloro-6,8-bis-(p-tolyl)-5,6-dihydro-8H-thiopyrano[4',3':4,5]thieno[2,3-d]pyrimidine are dissolved warm in 50 ml. of absolute toluene and heated to boiling for 3 hours with 1.7 g. of β-diethylamino-ethylamine, whilst stirring. The mixture is thereafter evaporated to dryness in vacuo and the residue is triturated with water. Recrystallisation of the resulting product from ethanol yields the 4 - (β-diethylamino-ethylamino)-6,8-bis-(p-tolyl)-5,6-dihydro - 8H - thiopyrano[4',3':4,5]thieno[2,3-d]pyrimidine of formula

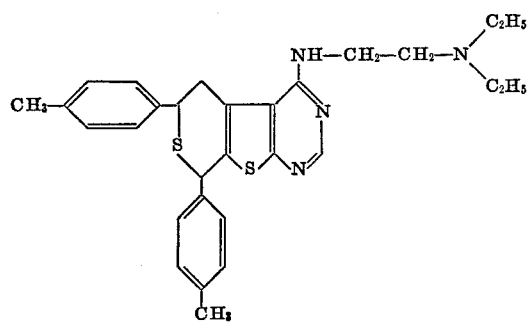

in the form of white crystals of melting point 178–181° C.

The dihydrochloride of melting point 215–220° C. is obtained by dissolving the base in the calculated quantity of 1 N ethanolic hydrochloric acid and adding isopropyl ether until crystallisation occurs.

The 4-chloro-6,8-bis-(p-tolyl)-5,6-dihydro-8H-thiopyrano[4',3':4,5]thieno[2,3-d]pyrimidine used as the starting product may for example be manufactured as follows:

130 g. of 1,5-bis-(p-tolyl)-penta-1,4-dien-3-one and 115 g. of anhydrous sodium acetate are heated to boiling in 3.5 l. of 90% strength ethanol, whilst stirring. Thereafter a vigorous stream of hydrogen sulphide gas is introduced for 7 hours. After cooling, a stream of air is passed through for a short time and 2 l. of water are then added. The mixture is stirred for a further 3 hours and the resulting precipitate then filtered off. Recrystallisation from ethanol yields the 2,6-bis-(p-tolyl)-2,3,5,6-tetrahydrothiopyran-4-one in the form of white crystals of melting point 127–130° C.

29.6 g. of 2,6-bis-(p-tolyl)-2,3,5,6-tetrahydro-thiopyran-4-one, 11.3 g. of ethylcyanoacetate, 3.2 g. of powdered sulphur and 10 ml. of morpholine are suspended in 100 ml. of absolute ethanol and stirred for 4 hours in a bath at 50° C. and thereafter for a further 8 hours at room temperature. The precipitated reaction product is filtered off. Recrystallisation from ethanol yields the 2-amino-3-carbethoxy-5,7-bis-(p-tolyl) - 4,5 - dihydro - 7H - thieno-[2,3-c]-thiopyrane of melting point 158–160° C.

10 g. of 2-amino-3-carbethoxy-5,7-bis-(p-tolyl)-4,5-dihydro-7H-thieno[2,3-c]thiopyrane are heated for 6 hours under nitrogen with 100 ml. of formamide, whilst stirring, in an oil bath at 180–190° C. After cooling, the resulting precipitate is filtered off and thoroughly washed with ethanol. Recrystallisation of the resulting product from ethanol yields the 4-hydroxy-6,8-bis-(p-tolyl)-5,6-dihydro-8H-thiopyrano[4',3':4,5]thieno[2,3-d]pyrimidine of melting point 212–215° C.

5 g. of 4-hydroxy-6,8-bis-(p-tolyl) - 5,6 - dihydro-8H-thiopyrano[4',3':4,5]thieno[2,3-d]pyrimidine are warmed for 2 hours with 50 ml. of phosphorus oxychloride in an oil bath at 120° C. Thereafter the excess phosphorus oxychloride is evaporated off in vacuo and the residue is mixed with ice water, while cooling. Fractional recrystallisation of the residue thus obtained from ethyl acetate permits the two stereoisomers of 4-chloro-6,8-bis-(p-tolyl) - 5,6 - dihydro - 8H - thiopyrano[4',3':4,5]thieno-[2,3-d]pyrimidine to be separated. One form melts at 248–249° C. and the other at 145–147° C.

EXAMPLE 10

4.5 g. of 4-chloro - 6,8 - bis-(p-methoxyphenyl)-5,6-dihydro - 8H - thiopyrano[4',3':4,5]thieno[2,3-d]pyrimidine are dissolved warm in 150 ml. of absolute toluene and heated to boiling with 2.9 g. of β-diethylamino-ethylamine for 3 hours, whilst stirring. The mixture is thereafter evaporated to dryness and the residue triturated with water. Boiling the resulting product with ethanol yields the 4-(β-diethylamino-ethylamino) - 6,8 - bis-(p-methoxyphenyl)-5,6-dihydro - 8H - thiopyrano[4',3':4,5]thieno-[2,3-d]pyrimidine of formula

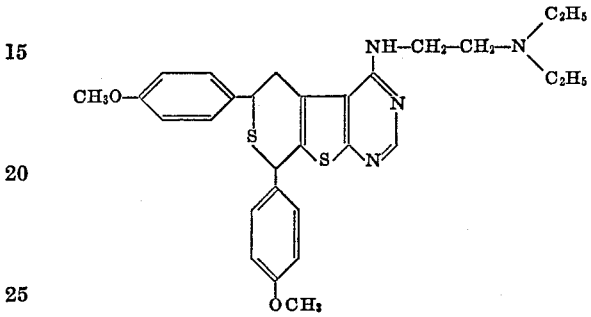

in the form of white crystals of melting point 175–180° C.

The dihydrochloride of melting point 218–220° C. is obtained by dissolving the base in the calculated quantity of 1 N ethanolic hydrochloric acid and adding ethyl acetate and isopropyl ether until crystallisation results.

The 4-chloro - 6,8-bis-(p-methoxyphenyl)-5,6-dihydro-8H-thiopyrano[4',3':4,5]thieno[2,3-d]pyrimidine used as the starting product may for example be manufactured as follows:

32.8 g. of 2,6-bis-(p-methoxyphenyl)-2,3,5,6-tetrahydrothiopyran-4-one, 11.3 g. of ethyl cyanoacetate, 3.2 g. of powdered sulphur and 10 ml. of morpholine in 150 ml. of absolute ethanol are stirred for 8 hours in a bath at 50° C. and thereafter for a further 4 hours at room temperature. On trituration, a solid product crystallises out from the reaction solution and this is filtered off and boiled with ethanol. The 2-amino-3-carbethoxy-5,7-bis-(p-methoxyphenyl) - 4,5 - dihydro-7H-thieno[2,3-c]thiopyrane of melting point 170–180° C. is thus obtained.

25 g. of 2 - amino - 3 - carbethoxy-5,7-bis-(p-methoxyphenyl) - 4,5 - dihydro-7H-thieno[2,3-c]thiopyrane are heated for 6 hours with 250 ml. of formamide under nitrogen and whilst stirring, in an oil bath at 180–190° C. The reaction mixture obtained after cooling is filtered off and boiled with ethanol. 4-hydroxy-6,8-bis-(p-methoxyphenyl)-5,6-dihydro - 8H - thiopyrano[4',3':4,5]thieno-[2,3-d]pyrimidine of melting point 240–250° C. with decomposition is thus obtained.

9 g. of 4-hydroxy-6,8-bis-(p-methoxyphenyl)-5,6-dihydro-8H-thiopyrano[4',3':4,5]thieno[2,3-d]pyrimidine are warmed for 2 hours with 90 ml. of phosphorus oxychloride in an oil bath at 120° C. The mixture is thereafter evaporated to dryness in vacuo and the residue mixed with ice water. After filtering off the reaction product and boiling with ethanol, 4-chloro-6,8-bis-(p-methoxyphenyl)-5,6 - dihydro - 8H - thiopyrano[4',3':4,5]thieno[2,3-d] pyrimidine of melting point 175–185° C. (with decomposition) is obtained.

EXAMPLE 11

2.9 g. of 4-chloro-6,8-bis-(3,4,5-trimethoxy-phenyl)-5,6 - dihydro - 8H - thiopyrano[4',3':4,5]thieno[2,3-d] pyrimidine are suspended in 250 ml. of absolute toluene and heated to boiling with 3.0 g. of β-diethylamino-ethyl-amine for 3 hours whilst stirring. The hot reaction solution is clarified with active charcoal and evaporated to dryness in vacuo. The residue is triturated with isopropyl ether until it solidifies and thereafter recrystallised from ethanol. The 4-(β-diethylamino-ethylamino) - 6,8 - bis-(3,4,5-trimethoxy-phenyl) - 5,6 - dihydro-8H-thiopyrano[4',3':4,5] thieno[2,3-d]pyrimidine of formula

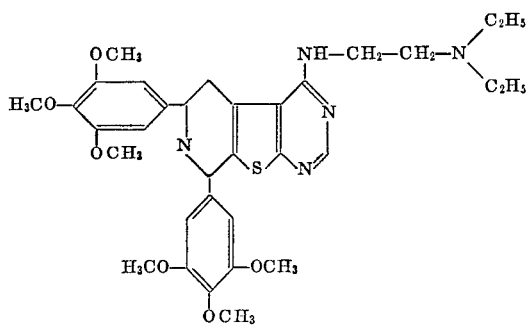

of melting point 182–185° C. is thus obtained.

The 4-chloro - 6,8 - bis-(3,4,5-trimethoxy-phenyl)-5,6-dihydro - 8H - thiopyrano[4',3':4,5]thieno[2,3-d]pyrimidine used as the starting product may for example be manufactured as follows:

28.5 g. of 1,5-bis-(3,4,5-trimethoxyphenyl)-penta-1,4-dien-3-one and 17 g. of anhydrous sodium acetate are heated to boiling in 2 l. of 90% strength methanol, whilst stirring. By introducing a stream of hydrogen sulphide gas for 7 hours and subsequent mixing with 2 l. of water whilst cooling, 2,6-bis-(3,4,5-trimethoxy-phenyl)-2,3,5,6-tetrahydro-thiopyran-4-one is obtained after recrystallisation from 50% strength methanol in the form of white crystals of melting point 174–175° C.

22.4 g. of 2,6 - bis - (3,4,5-trimethoxyphenyl)-2,3,5,6-tetrahydro-thiopyran-4-one, 5.65 g. of ethyl cyanoacetate, 1.6 g. of powdered sulphur and 5 ml. of morpholine are suspended in 100 ml. of absolute ethanol and stirred for 4 hours in a bath at 50° C. and thereafter for a further 10 hours at room temperature. The precipitated reaction product is filtered off and boiled with ethanol. 2-amino-3-carbethoxy - 5,7 - bis-(3,4,5-trimethoxyphenyl)-4,5-dihydro-7H-thieno[2,3-c]thiopyrane of melting point 202–203° C. is thus obtained.

10 g. of 2-amino-3-carbethoxy - 5,7 - bis - (3,4,5 - trimethoxyphenyl)-4,5-dihydro-7H-thieno[2,3-c]thiopyrane in 60 ml. of formamide are heated for 6 hours under nitrogen whilst stirring, in an oil bath at 180–190° C. After cooling the reaction product is filtered off and recrystallised from dimethylformamide-ethanol. The 4-hydroxy-6,8-bis-(3,4,5-trimethoxyphenyl) - 5,6 - dihydro-8H-thiopyrano[4',3':4,5] - thieno[2,3 - d]pyrimidine of melting point 255–260° C. is thus obtained.

7 g. of 4-hydroxy-6,8-bis-(3,4,5-trimethoxyphenyl)-5,6-dihydro - 8H - thiopyrano[4',3':4,5]thieno[2,3-d]pyrimidine are heated for 2 hours with 70 ml. of phosphorus oxychloride in an oil bath at 120° C. The excess phosphorus oxychloride is evaporated off in vacuo and the residue mixed with ice water. The 4-chloro-6,8-bis-(3,4,5-trimethoxyphenyl) - 5,6 - dihydro-8H-thiopyrano[4',3':4,5]thieno[2,3-d]pyrimidine of melting point 255–260° C. (with decomposition) is thus obtained.

EXAMPLE 12

8 g. of 4-chloro-6,8-bis-(p-fluorophenyl)-5,6-dihydro-8H-thiopyrano[4',3':4,5]thieno[2,3-d]pyrimidine are dissolved warm in 100 ml. of absolute toluene and heated to boiling for 3 hours with 7.0 g. of β-diethylamino-ethylamine whilst stirring. The mixture is thereafter evaporated to dryness in vacuo and the residue triturated with 50% strength aqueous ethanol. Recrystallisation of the resulting product from ethanol yields the 4-(β-diethylamino-ethylamino)-6,8-bis-(p-fluorophenyl) - 5,6 - dihydro-8H-thiopyrano]4',3':4,5]thieno[2,3-d]pyrimidine of formula

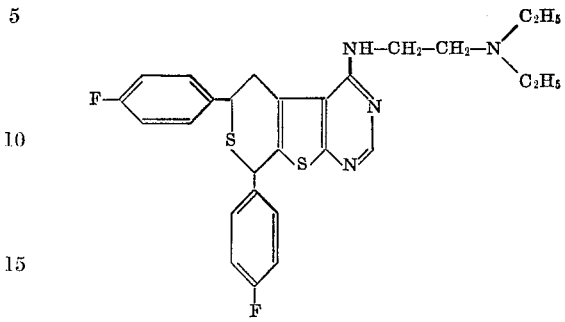

in the form of white crystals of melting point 164–168° C.

The dihydrochloride of melting point 208–210° C. is obtained by dissolving the base in the calculated quantity of 1 N ethanolic hydrochloric acid and adding isopropyl ether until crystallisation results.

The 4-chloro-6,8-bis-(p-fluorophenyl)-5,6-dihydro-8H-thiopyrano[4',3':4,5]thieno[2,3-d]pyrimidine used as the starting product can for example be manufactured as follows:

79 g. of 1,5 - bis(p - fluorophenyl)-penta-1,4-dien-3-one and 80 g. of anhydrous sodium acetate in 2 l. of 90% strength ethanol are heated to boiling whilst stirring. By introducing a stream of hydrogen sulphide gas for 6 hours and subsequently gradually adding 2 l. of water whilst cooling, the 2,6-bis-(p-fluorophenyl)-2,3,5,6 - tetrahydro-thiopyran-4-one of melting point 125–126° C. is obtained after recrystallisation from ethanol.

30.4 g. of 2,6-bis-(p-fluorophenyl)-2,3,5,6-tetrahydro-thiopyran-4-one, 11.3 g. of ethyl cyanoacetate, 3.2 g. of powdered sulphur and 10 ml. of morpholine are suspended in 100 ml. of absolute ethanol and stirred for 4 hours in a bath at 50° C. and thereafter for a further 8 hours at room temperature. After filtering off the reaction product and recrystallising from absolute ethanol, 2-amino-3-carbethoxy-5,7-bis-(p - fluorophenyl)-4,5-dihydro-7H-thieno[2,3-c]thiopyrane of melting point 161–162° C. is obtained.

26 g. of 2-amino-3-carbethoxy-5,7-bis-(p-fluorophenyl)-4,5-dihydro-7H-thieno[2,3-c]thiopyrane are heated with 130 ml. of formamide under nitrogen for 4 hours whilst stirring, in an oil bath at 180–190° C. The reaction product is filtered off and recrystallised from ethanol. The 4-hydroxy-6,8-bis-(p-fluorophenyl) - 5,6 - dihydro-8H-thiopyrano[4',3':4,5]thieno[2,3 - d]pyrimidine of melting point 255–260° C. is thus obtained.

10 g. of 4-hydroxy-6,8-bis(p-fluorophenyl)-5,6-dihydro-8H - thiopyrano[4'3':4,5]thieno[2,3 - d]pyrimidine are warmed with 100 ml. of phosphorus oxychloride for 2 hours in an oil bath at 120° C. The excess phosphorus oxychloride is thereafter evaporated off in vacuo and the residue mixed with ice water. The resulting precipitate is filtered of, triturated with ethanol and recrystallised from ethanol. 4 - chloro-6,8-bis-(p - fluorophenyl)-5,6-dihydro-8H-thiopyrano[4',3':4,5]thieno[2,3-d]pyrimidine of melting point 160–161° C. is thus obtained.

EXAMPLE 13

2.3 g. of 4-chloro-6,8-bis-(o-chlorophenyl)-5,6-dihydro-8H-thiopyrano[4',3':4,5]thieno[2,3-d]pyrimidine are dissolved warm in 150 ml. of absolute toluene and heated to boiling for 3 hours with 1.5 g. of β-diethylamino-ethylamine whilst stirring. The mixture is thereafter evaporated to dryness in vacuo and the residue triturated with water. The product thus obtained is recrystallised from ethanol. 4-(β-diethylamino-ethylamino) - 6,8 - bis - (o - chlorophenyl) - 5,6 - dihydro - 8H - thiopyrano[4',3':4,5]thieno[2,3-d]pyrimidine of formula

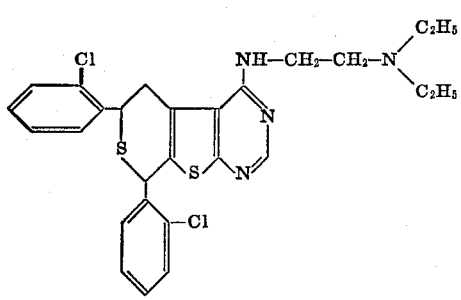

is thus obtained in the form of white crystals of melting point 240–245° C.

The 4-chloro-6,8-bis-(o-chlorophenyl)-5,6-dihydro-8H-thiopyrano[4',3':4,5]thieno[2,3-d]pyrimidine used as the starting product may for example be manufactured as follows:

80 g. of 1,5-bis-(o-chlorophenyl)-penta-1,4-dien-3-one and 65 g. of anhydrous sodium acetate are heated to boiling in 3 l. of 90% strength ethanol, whilst stirring. By introducing a stream of hydrogen sulphide gas for 6 hours and subsequently adding 2 l. of water whilst cooling, 2,6-bis-(o-chlorophenyl)-2,3,5,6-tetrahydro - thiopyran-4-one of melting point 120–122° C. is obtained after recrystallisation from ether.

16.8 g. of 2,6-bis-(o-chlorophenyl)-2,3,5,6-tetrahydro-thiopyran-4-one, 5.65 g. of ethyl cyanoacetate, 1.6 g. of powdered sulphur and 5 ml. of morpholine in 50 ml. of absolute ethanol are stirred for 5 hours in a bath at 50° C. and thereafter for a further 8 hours at room temperature. After filtering off the reaction product and recrystallising from ethanol, 2-amino-3-carbethoxy-5,7-bis-(o-chlorophenyl)-4,5-dihydro - 7H - thieno[2,3-c]thiopyrane of melting point 166–167° C. is obtained.

5 g. of 2-amino - 3 - carbethoxy-5,7-bis-(o-chlorophenyl)-4,5-dihydro - 7H - thieno[2,3-c]thiopyrane are heated with 50 ml. of formamide under nitrogen for 4 hours in an oil bath at 180–190° C., whilst stirring. After filtering off the reaction product and recrystallising from dimethylformamide-ethanol, 4-hydroxy - 6,8 - bis-(o-chlorophenyl)-5,6-dihydro - 8H - thiopyrano[4',3':4,5]thieno[2,3-d]pyrimidine of melting point 290–300° C. (with decomposition) is obtained.

6 g. of 4 - hydroxy-6,8-bis-(o-chlorophenyl) - 5,6-dihydro-8H-thiopyrano[4',3':4,5]thieno[2,3-d]pyrimidine are warmed for 2 hours with 60 ml. of phosphorus oxychloride in a bath at 120° C. The excess phosphorus oxychloride is evaporated off in vacuo and the residue mixed with ice water. After recrystallisation from benzene of the reaction product thus obtained, 4-chloro-6,8-bis-(o-chlorophenyl)-5,6-dihydro - 8H - thiopyrano[4',3':4,5]thieno[2,3-d]pyrimidine of melting point 250–252° C. is obtained.

EXAMPLE 14

14 g. of 4-chloro-6,8-bis-(m-chlorophenyl)-5,6-dihydro-8H-thiopyrano[4',3':4,5]thieno[2,3-d]pyrimidine are dissolved warm in 400 ml. of absolute toluene and heated to boiling for 3 hours with 8.0 g. of β-diethylamino-ethylamine, whilst stirring. The mixture is thereafter evaporated to dryness in vacuo and the residue triturated with water. Recrystallisation of the resulting product from ethanol yields 4-(β-diethylamino-ethylamino) - 6,8 - bis-(m-chlorophenyl) - 5,6 - dihydro - 8H - thiopyrano[4',3':4,5]thieno[2,3-d]pyrimidine of formula

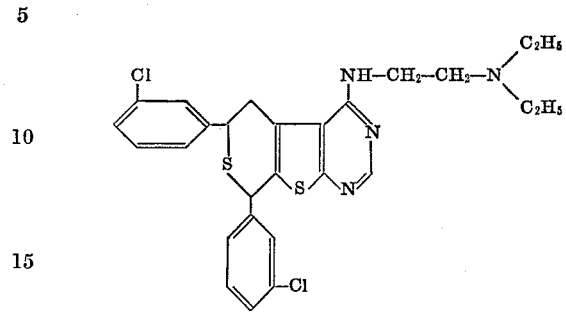

in the form of white crystals of melting point 178–180° C.

On dissolving the base in the calculated quantity of 1 N ethanolic hydrochloric acid and adding isopropyl ether until crystallisation takes place, the dihydrochloride of melting point 238–240° C. (with decomposition) is obtained.

The 4-chloro-6,8-bis-(m-chlorophenyl)-5,6-dihydro-8H-thiopyrano[4',3':4,5]thieno[2,3-d]pyrimidine used as the starting product may for example be manufactured as follows:

90 g. of 1,5-bis-(m-chlorophenyl)-penta-1,4-dien-3-one and 80 g. of anhydrous sodium acetate in 3 l. of 90% strength ethanol are heated to boiling whilst stirring. By introducing a stream of hydrogen sulphide gas for 6 hours and subsequently adding 2 l. of water whilst cooling, 2,6-bis-(m-chlorophenyl)-2,3,5,6-tetrahydro - thiopyran-4-one is obtained in the form of white crystals of melting point 166–167° C. after recrystallisation from ethyl acetate.

16.8 g. of 2,6-bis-(m-chlorophenyl)-2,3,5,6-tetrahydro-thiopyran-4-one, 5.65 g. of ethyl cyanoacetate, 1.6 g. of powdered sulphur and 5 ml. of morpholine are suspended in 100 ml. of absolute ethanol and stirred for 5 hours in a bath at 50° C. and thereafter for a further 8 hours at room temperature. After filtering off the reaction product and recrystallising from ether, 2-amino-3-carbethoxy-5,7-bis-(m - chlorophenyl)-4,5-dihydro-7H-thieno[2,3-c]thiopyrane of melting point 145–149° C. is obtained.

5 g. of 2-amino-3-carbethoxy-5,7-bis-(m - chlorophenyl)-4,5-dihydro - 7H - thieno[2,3-d]thiopyrane are heated for 4 hours under nitrogen with 50 ml. of formamide, whilst stirring, in an oil bath at 180–190° C. After filtering off the reaction product and recrystallising from dimethylformamide-ethanol, 4-hydroxy-6,8-bis-(m-chlorophenyl)-5,6-dihydro - 8H - thiopyrano[4',3':4,5]thieno[2,3-d]pyrimidine of melting point 224–226° C. is obtained.

4 g. of 4-hydroxy - 6,8-bis - (m-chlorophenyl)-5,6-dihydro - 8H - thiopyrano[4',3':4,5]thieno[2,3-d]pyrimidine are warmed for 2 hours with 40 ml. of phosphorus oxychloride in an oil bath at 120° C. The excess phosphorus oxychloride is thereafter evaporated off in vacuo and the residue mixed with ice water. The resulting precipitate is filtered off and washed with water. Recrystallisation from benzene-petroleum ether yields 4-chloro-6,8-bis-(m-chlorophenyl)-5,6-dihydro - 8H - thiopyrano[4',3':4,5]thieno[2,3-d]pyrimidine of melting point 214–215° C.

EXAMPLE 15

3.6 g. of 4-chloro-6,8-bis-(2,4-dichlorophenyl)-5,6-dihydro - 8H - thiopyrano[4',3':4,5]thieno[2,3-d]pyrimidine are dissolved warm in 60 ml. of absolute toluene and heated to boiling for 3 hours with 2.0 g. of β-diethylamino-ethylamine, whilst stirring. The mixture is thereafter evaporated to dryness in vacuo and the residue triturated with water. Recrystallisation of the resulting product from benzene yields 4-(β-diethylamino-ethylamino)-

6,8-bis-(2,4-dichlorophenyl) - 5,6 - dihydro - 8H - thiopyrano[4',3':4,5]thieno[2,3-d]pyrimidine of formula

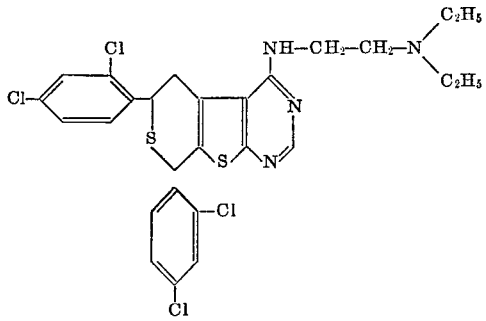

in the form of white crystals of melting point 234–242° C.

The 4-chloro-6,8-bis-(2,4-dichlorophenyl) - 5,6 - dihydro - 8H - thiopyrano[4',3':4,5]thieno[2,3-d]pyrimidine used as the starting product may for example be manufactured as follows:

29 g. of 1,5-bis-(2,4-dichlorophenyl)-penta-1,4-dien-3-one and 25 g. of anhydrous sodium acetate in 1 l. of 90% strength ethanol are heated to boiling whilst stirring. By introducing a stream of hydrogen sulphide gas for 5 hours and adding 500 ml. of water whilst cooling, 2,6-bis-(2,4 - dichlorophenyl) - 2,3,5,6 - tetrahydro-thiopyran-4-one is obtained in the form of white crystals of melting point 167–170° C. after recrystallisation from ethyl acetate.

20.3 g. of 2,6-bis-(2,4-dichlorophenyl)-2,3,5,6-tetrahydrothiopyran-4-one, 5.65 g. of ethyl cyanoacetate, 1.6 g. of powdered sulphur and 5 ml. of morpholine are suspended in 100 ml. of absolute ethanol and stirred for 6 hours in a bath at 50° C. and thereafter for a further 8 hours at room temperature. The reaction product is filtered off and recrystallised from ethanol. 2-amino-3-carbethoxy - 5,7 - bis - (2,4 - dichlorophenyl)-4,5-dihydro-7H-thieno[2,3-c]thiopyrane of melting point 140–160° C. is thus obtained.

10 g. of 2 - amino - 3-carbethoxy-5,7-bis-(2,4-dichlorophenyl( - 4,5 - dihydro - 7H - thieno[2,3-c]thiopyrane are heated for 6 hours under nitrogen with 100 ml. of formamide, while stirring, in an oil bath at 180–190° C. After filtering off the reaction mixture and boiling with ethanol, 4 - hydroxy-6,8-bis-(2,4-dichlorophenyl)-5,6-dihydro-8H-thiopyrano[4',3':4,5]thieno[2,3-d]pyrimidine of melting point 285° C. (with decomposition) is obtained.

4 g. of 4-hydroxy-6,8-bis-(2,4-dichlorophenyl)-5,6-dihydro - 8H - thiopyrano[4',3',4,5]thieno[2,3 - d]pyrimidine are warmed for 2 hours with 40 ml. of phosphorus oxychloride in an oil bath at 120° C. The mixture is thereafter evaporated to dryness in vacuo and the residue mixed with ice water. Recrystallisation from ethyl acetate of the product thus obtained yields 4-chloro-6,8-bis-(2,4-dichlorophenyl) - 5,6 - dihydro-8H-thiopyrano[4',3':4,5]thieno[2,3-d]pyrimidine of melting point 245–247° C.

EXAMPLE 16

1 g. of 4-chloro-6,8-bis-(p-chlorophenyl)-5,6-dihydro-8H - thiopyrano[4',3':4,5]thieno[2,3 - d]pyrimidine - 7-oxide is dissolved in 25 ml. of β-diethylamino-ethylamine at room temperature. The solution is immediately poured into ½ l. of water and the resulting precipitate is filtered off. Recrystallisation from ethanol yields 4-(β-diethylaminoethylamino) - 6,8 - bis - (p-chlorophenyl)-5,6-dihydro - 8H - thiopyrano[4',3':4,5]thieno[2,3 - d]pyrimidine-7-oxide of formula

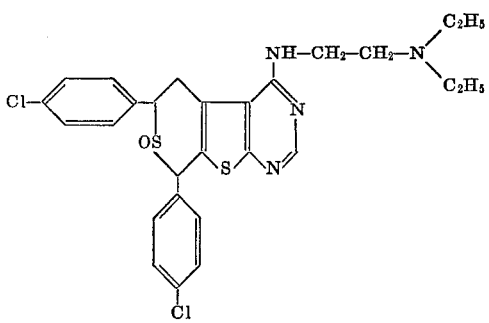

in the form of white crystals of melting point 205–207° C.

The 4 - chloro - 6,8-bis-(p-chlorophenyl)-5,6-dihydro-8H - thiopyrano[4',3':4,5]thieno[2,3 - d]pyrimidine - 7-oxide used as the starting product can for example be manufactured as follows:

4.6 g. of a mixture of cis- and trans-4-chloro-6,8-bis-(p - chlorophenyl)-5,6-dihydro-8H-thiopyrano[4',3':4,5]thieno[2,3-d]pyrimidine are dissolved in 100 ml. of methylene chloride and mixed over the course of 45 minutes, whilst stirring, with a solution of 1.9 g. of 85% strength m-chloroperbenzoic acid in 100 ml. of methylene chloride. The reaction solution is stirred for a further 2 hours at room temperature and is then extracted by shaking with 100 ml. of saturated sodium bicarbonate solution. The methylene chloride solution is separated off, dried and evaporated to dryness in vacuo. The residue is triturated with ethanol and boiled with benzene, 4-chloro-6,8 - bis - (p-chlorophenyl)-5,6-dihydro-8H-thiopyrano-[4',3':4,5]thieno[2,3-d]pyrimidine - 7 - oxide of melting point 210–215° C. (with decomposition) is thus obtained.

EXAMPLE 17

3.5 g. of 4-chloro-6,8-bis-(p-chlorophenyl)-5,6-dihydro - 8H - thiopyrano[4',3':4,5]thieno[2,3-d]pyrimidine-7,7-dioxide are dissolved hot in 200 ml. of absolute toluene and heated for 3 hours to boiling with 2.0 g. of β-diethylamino-ethylamine, whilst stirring. The mixture is thereafter evaporated to dryness in vacuo and the residue triturated with water until it solidifies. Recrystallisation from ethanol yields 4-(β-diethylamino-ethylamino)-6,8-bis - (p - chlorophenyl) - 5,6 - dihydro-8H-thiopyrano-[4',3':4,5]thieno[2,3-d]pyrimidine-7,7-dioxide of formula

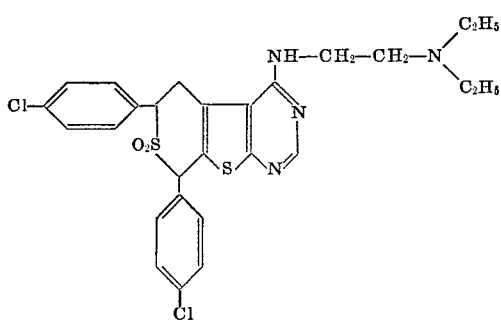

in the form of white crystals of melting point 234–236° C.

The 4 - chloro - 6,8-bis-(p-chlorophenyl)-5,6-dihydro-8H - thiopyrano[4',3':4,5]thieno[2,3-d]pyrimidine - 7,7-dioxide used as the starting product can for example be manufactured as follows:

4.6 g. of a mixture of cis- and trans-4-chloro-6,8-bis-(p-chlorophenyl) - 5,6 - dihydro-8H-thiopyrano[4',3':4,5]thieno[2,3-d]pyrimidine are dissolved in 100 ml. of methylene chloride and mixed with 4.4 g. of 85% strength m-chloroperbenzoic acid whilst stirring. The methylene chloride solution is stirred for a further 3 hours at room temperature and is then thoroughly shaken with 100 ml.

of 0.5 N sodium hydroxide solution. The methylene chloride solution is separated off, dried and evaporated to dryness in vacuo. The residue crystallises on trituration with 50 ml. of ethanol. The product thus obtained is briefly boiled up with benzene. 4-chloro-6,8-bis-(p-chlorophenyl) - 5,6 - dihydro - 8H-thiopyrano[4',3':4,5]thieno-[2,3-d]pyrimidine-7,7-dioxide is thus obtained in the form of white crystals of melting point 280–285° C. (with decomposition).

EXAMPLE 18

13.9 g. of cis-4-chloro-6,8-bis-(para-chlorophenyl)-5,6-dihydro - 8H - thiopyrano[4',3':4,5]thieno[2,3-d]pyrimidine are dissolved in 300 ml. of absolute toluene while heating, and the solution mixed with 8.6 g. of β-morpholino-ethylamine, then boiled while stirring for 3 hours. The batch is then evaporated to dryness under vacuum, and the residue triturated with water. Boiling of the resulting product with ethanol yields cis-4-(β-morpholino-ethylamino)-6,8-bis-(para - chlorophenyl) - 5,6 - dihydro-8H-thiopyrano[4',3':4,5]thieno[2,3-d]pyrimidine of the formula

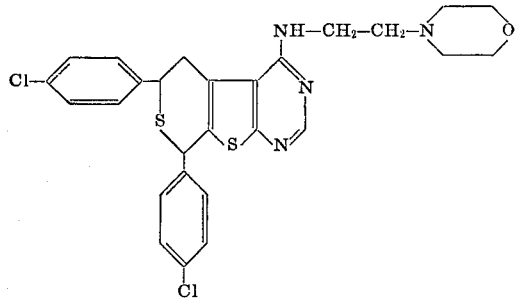

in the form of white crystals of melting point 228–230° C.

EXAMPLE 19

5.15 g. of cis-4-chloro-6,8-bis-(para-fluorophenyl)-5,6-dihydro - 8H - thiopyrano[4',3':4,5]thieno[2,3-d]pyrimidine are dissolved in 100 ml. of absolute toluene with the application of heat, and the solution boiled with 2.4 g. of β-dimethylamino-ethylamine while stirring for 3 hours. The batch is then evaporated to dryness under reduced pressure and the residue is triturated with water. Recrystallisation of the resulting product from absolute ethanol gives cis-4-(β-dimethylamino - ethylamino)-6,8-bis-(para-fluorophenyl) - 5,6 - dihydro - 8H - thiopyrano-[4',3':4,5]thieno[2,3-d]-pyrimidine of the formula

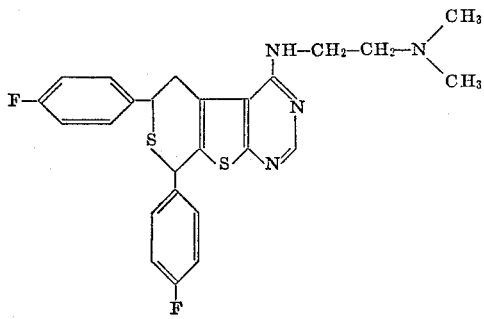

in the form of white crystals melting at 196–197° C.

The dihydrochloride of this compound melts at 240° C. (with decomposition) and its bismethanesulfonate melts at 188–190° C.

EXAMPLE 20

4.7 g. of trans-4-chloro-6,8-bis-(para-fluorophenyl)-5,6-dihydro - 8H - thiopyrano[4',3':4,5]thieno[2,3 - d]pyrimidine are dissolved in 150 ml. of absolute toluene with the application of heat, and the solution boiled with 2.3 g. of β-dimethylamino-ethylamine while stirring for 3 hours. The batch is then evaporated to dryness under reduced pressure and the residue is triturated with water. The resulting product is recrystallised from absolute ethanol, and trans-4-(β-dimethylamino - ethylamino) - 6,8 - bis - (para-fluorophenyl) - 5,6 - dihydro - 8H - thiopyrano[4',3':4,5]thieno[2,3-d]pyrimidine of the formula

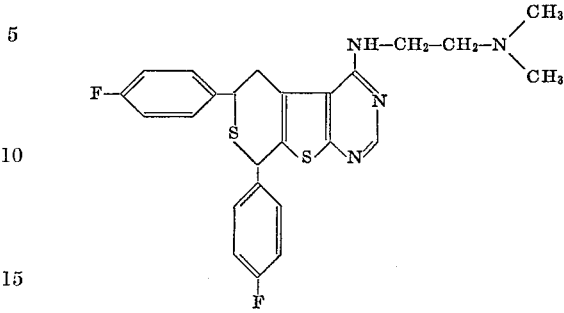

obtained in the form of white crystals which melt at 183–184° C.

The dihydrochloride of this compound melts at 245° C. (with decomposition) and its bismethanesulfonate at 140° C.

The pure trans- and cis-forms of 4-chloro-6,8-bis-(para-fluorophenyl) - 5,6 - dihydro - 8H - thiopyrano[4',3':4,5] thieno[2,3-d]pyrimidine used as starting material can be obtained as follows:

27.5 g. of a mixture of the two stereoisomers of 4-chloro - 6,8 - bis - (para-fluorophenyl)-5,6-dihydro-8H-thiopyrano[4',3':4,5]thieno[2,3-d]pyrimidine are dissolved in 80 ml. of chloroform and chromatographed over a column of 1.3 kg. of silica gel "Merck," 0.05–0.2 mm. Elution is performed with a mixture of 4 parts of isopropyl ether and 1 part of chloroform, the fractions being currently checked by thin-layer chromatography. From the first usable fractions there is obtained by crystallisation from benzene trans - 4 - chloro-6,8-bis-(para-fluorophenyl)-5,6-dihydro-8H-thiopyrano[4',3':4,5]thieno[2,3 - d]pyrimidine which melts at 191–192° C. From the fractions which follow there is obtained by crystallisation from much isopropylether cis - 4 - chloro-6,8-bis-(para-fluorophenyl)-5,6-dihydro - 8H - thiopyrano[4',3':4,5]thieno[2,3 - d]pyrimidine which melts at 193–194° C.

EXAMPLE 21

4.8 g. of 2-methyl-4-chloro-6,8-bis-(para-chlorophenyl)-5,6 - dihydro - 8H - thiopyrano[4',3':4,5]thieno[2,3-d]pyrimidine are dissolved in 300 ml. of absolute toluene while heating, and the solution stirred with 2.0 g. of β-dimethylamino-ethylamine in an oil bath for 3 hours at 120° C. The batch is then evaporated to dryness under reduced pressure, and the residue triturated with water. Recrystallisation of the resulting product from ethanol gives 2-methyl - 4 - (β-dimethylamino-ethylamino)-6,8-bis-(para-chlorophenyl)-5,6-dihydro - 8H - thiopyrano[4',3':4,5]thieno-[2,3-d]pyrimidine of the formula

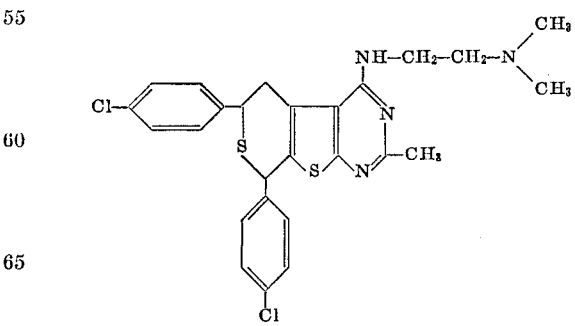

in the form of crystals which melt at 176–177° C. The mixture of isomers can be separated by fractional crystallisation from ethanol into the pure trans-compound, M.P. 175–177° C. (sinters from 160° C.) and into the pure cis-compound, M.P. 187 to 189° C.

The 2-methyl - 4 - chloro-6,8-bis-(para-chlorophenyl)-5,6-dihydro - 8H - thiopyrano[4',3':4,5]-thieno[2,3-d]pyrimidine used as starting material can be prepared for example as follows:

22 g. of 2-amino-3-carbamoyl-5,7-bis - (para - chlorophenyl)-4,5-dihydro-7H-thieno[2,3-c]thiopyran are heated for 6 hours in an oil bath of 150° C. with 100 ml. of acetic anhydride. The reaction solution is then poured into 1 liter of water and stirred until a solid precipitate forms. The latter is filtered off and dried. The product so obtained is dissolved in 5 parts by volume of chloroform and the solution poured over a chromatographic column of 50 times the quantity of silica gel "Merck" 0.05-0.2 mm. Elution is performed with a mixture of 19 parts of chloroform and 1 part of ethyl acetate, and the resulting fractions currently checked by thin-layer chromatography. From the middle fractions there can be isolated by crystallisation 2 - methyl-4-hydroxy-6,8-bis-(para-chlorophenyl)-5,6 - dihydro-8H-thiopyrano[4',3':4,5]thieno[2,3 - d)pyrimidine melting at 249–251° C.

5 g. of 2-methyl - 4 - hydroxy-6,8-bis-(para-chlorophenyl) - 5,6 - dihydro - 8H - thiopyrano[4',3':5]thieno[2,3-d]pyrimidine and 1.5 ml. of N,N-dimethyl-aniline are heated for 15 hours with 50 ml. of phosphorus oxychloride in an oil bath of 120° C. The excess phosphorus exychloride is then evaporated in vacuo, and the residue is mixed with ice water while cooling. The resulting solid precipitate is filtered off with suction and dried. The resulting product is then dissolved in a small quantity of chloroform and the solution poured oved a chromatographic column with the 40-fold quanity of silica gel "Merck" 0.05–0.2 mm. Elution is performed with chloroform and the resulting fractions currently checked by thin-layer chromatography. It is thus possible to isolate from the first usable fractions 2-methyl-4-chloro-6,8-bis-(para-chlorophenyl) - 5,6 - dihydro - 8H - thiopyranol[4',3':4,5]thieno[2,3-d]pyrimidine which, after being recrystallised from isopropyl ether, melts at 170–172° C.

EXAMPLE 22

A solution of 4.6 g. of cis - 4 - chloro-6,8-bis-(para-chlorophenyl) - 5,6 - dihydro - 8H - thiopyrano[4',3':4,5]thieno[2,3-d]pyrimidine in 100 ml. of absolute toluene is added dropwise with stirring in the course of one hour to a boiling solution of 12.0 g. of ethylenediamine in 150 ml. of absolute toluene. The reaction mixture is then heated at the boil for two hours. The reaction solution is evaporated to dryness in vacuo and the residue made to crystallize by the addition of water. By recrystallization from absolute ethanol there is obtained cis-4-(β-aminoethylamino) - 6,8 - bis - (para - chlorophenyl) - 5,6 - dihydro - 8H - thiopyrano[4',3':4,5]thieno[2,3 - d]pyrimidine of the formula

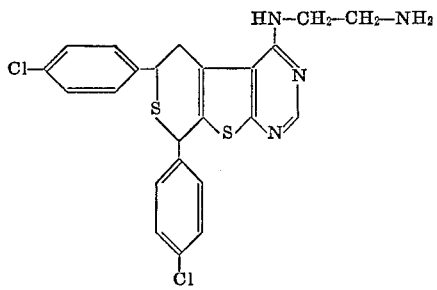

in the form of crystals melting at 200–202° C.

The dihydrochloride melting at 267–270° C. is obtained by dissolving the above product in an excess of ethanolic hydrochloric acid with heating.

EXAMPLE 23

21.5 grams of cis-4-chloro-6,8 - phenyl - (para-chlorophenyl) - 5,6 - dihydro - 8H - thiopyrano[4',3':4,5]thieno[2,3-d]pyrimidine are dissolved with heating in 400 ml. of absolute toluene and heated at the boil for 3 hours with stirring with 10.0 g. of β-(dimethylamino)-ethylamine. The reaction mixture is then evaporated to dryness in vacuo and the residue is triturated with ethanol of 50% strength. By recrystallization from absolute ethanol there is obtained cis-4-(β-dimethylamino-ethylamino)-6,8-phenyl-(para - chlorophenyl) - 5,6 - dihydro - 8H - thiopyrano[4',3':4,5]thieno[2,3-d]pyrimidine in the form of crystals melting at 145–148° C.

By dissolving the base in the calculated quantity of N-ethanolic hydrochloric acid with heating and with the addition of isopropyl ether until the product crystallizes there is obtained the dihydrochloride melting at 223–225° C. (with decomposition).

EXAMPLE 24

14.9 grams of trans-4-chloro-6,8-phenyl-(para-chlorophenyl) - 5,6 - dihydro - 8H - thiopyrano[4',3':4,5]thieno[2,3-d]pyrimidine are dissolved with heating in 500 ml. of toluene and heated at the boil for 3 hours with stirring with 6.8 g. of β-(dimethylamino)-ethylamine. The reaction mixture is then evaporated to dryness in vacuo and the residue triturated with ethanol of 50% strength. By recrystallization from absolute ethanol there is obtained trans-4-(β - dimethylamino - ethylamino) - 6,8 - phenyl-(para - chlorophenyl) - 5,6 - dihydro - 8H - thiopyrano[4',3':4,5]thieno[2,3-d]pyrimidine in the form of crystals melting at 186–188° C.

By dissolving the base in the calculated quantity of N-ethanolic hydrochloric acid with heating and by adding isopropyl ether until crystallization sets in there is obtained the dihydrochloride melting at 238–240° C. (with decomposition).

The trans- and cis-4-chloro-6,8-phenyl-(para-chlorophenyl) - 5,6 - dihydro - 8H - thiopyrano[4',3':4,5]thieno[2,3-d]pyrimidine, respectively, used as starting material may be prepared, for example, as follows:

A mixture of 18 g. of para-chlorobenzaldehyde and 10.6 g. of benzaldehyde and 50 ml. of absolute ethanol is added to a solution of 10 g. of sodium hydroxide in a mixture of 150 ml. of water and 80 ml. of ethanol with stirring in the course of 20 minutes. Stirring is continued for one hour at room temperature, the precipitate formed is filtered with suction and thoroughly washed with water. By recrystallization from ethanol there is obtained 1-phenyl-5-(para - chlorophenyl)penta - 1,4 - dien - 3 - one in the form of yellow crystals melting at 145–150° C.

100 grams of 1 - phenyl - 5 - (para-chlorophenyl)-penta-1,4-dien-3-one and 100 g. of anhydrous sodium acetate are heated to the boil in 3 litres of ethanol of 90% strength with stirring. By introducing a stream of hydrogen sulphide gas for 4 hours and then adding 2 litres of water with cooling there is obtained, after recrystallization from ethanol, 2-phenyl - 6 - (para-chlorophenyl) - 2,3,5,6 - tetrahydro-thiopyrane-4-one in the form of white crystals melting at 122–124° C.

30.2 grams of 2-phenyl-6-(para-chlorophenyl)-2,3,5,6-tetrahydro-thiopyrane-4-one, 11.3 g. of ethyl cyanoacetate, 3.2 g. of powdered sulphur and 10 ml. of morpholine are suspended in 150 ml. of absolute ethanol and stirred for 6 hours in a bath at 50° C. The reaction mixture is allowed to stand overnight, then evaporated to dryness in vacuo and the residue made to crystallize by trituration with ethanol. After filtering with suction and recrystallization from ethanol there is obtained 2-amino-3-carbethoxy-5,7-phenyl-(para - chlorophenyl)-4,5-dihydro-7H-thieno[2,3-c]thiopyrane melting at 125–130° C.

10 grams of 2-amino-3-carbethoxy-5,7-phenyl-(para-chlorophenyl)-4,5-dihydro-7H - thieno[2,3-d]thiopyrane are heated with 100 ml. of formamide under nitrogen for 6 hours in an oil-bath at 185–190° C. After cooling, the reaction product is filtered with suction and recrystallized from 100 ml. of absolute ethanol to yield 4-hydroxy-6,8-phenyl - (para-chlorophenyl) - 5,6-dihydro-8H-thiopyrano[4',3':4,5]thieno[2,3-d]pyrimidine melting at 215–218° C.

5.5 grams of 4-hydroxy-6,8-phenyl-(para-chlorophenyl)-5,6-dihydro-8H - thiopyrano[4′,3′:4,5]thieno[2,3-d]pyrimidine are heated with 55 ml. of phosphorus oxychloride for 2 hours in a oil bath at 120° C. The excess phosphorus oxychloride is then evaporated in vacuo and the residue treated with ice-water. The resulting precipitate is filtered with suction, washed with water and, after drying, boiling with 50 ml. of absolute ethanol. The resulting product is dissolved in a mixture of chloroform and isopropyl ether (1:2) and chromatographed on a column with 150 times the amount of silica gel. The batch is eluted with a mixture of 9 parts of isopropyl ether and 1 part of chloroform and the separation is observed continuously by means of thin-layer chromatography. By boiling the appropriate eluates with a little absolute ethanol there are obtained trans-4-chloro-6,8-phenyl-(para-chlorophenyl)-5,6-dihydro - 8H - thiopyrano[4′,3′:4,5]thieno[2,3 - d]pyrimidine melting at 154–156° C. and the corresponding cis-stereoisomer melting at 184–186° C.

EXAMPLE 25

19 grams of cis-4-chloro-6,8-(para-chlorophenyl)-(para-fluorophenyl)-5,6 - dihydro-8H-thiopyrano[4′,3′:4,5]thieno[2,3-d]pyrimidine are dissolved in 400 ml. of absolute toluene with heating and heated to the boil with 8.3 g. of β-(dimethylamino)-ethylamine with stirring. The reaction mixture is then evaporated to dryness in vacuo and the residue triturated with ethanol of 50% strength. By recrystallization of the resulting solid product from ethanol there is obtained cis-4-(β-dimethylamino-ethylamino)-6,8 - (para-chlorophenyl)-(para-fluorophenyl)-5,6-dihydro-8H - thiopyrano[4′,4′:4.5-]thieno[2,3-d]pyrimidine in the form of crystals melting at 197–199° C.

By dissolving the base in the calculated quantity of N-ethanolic hydrochloric acid with heating and by adding isopropyl ether until crystallization sets in there is obtained the dihydrochloride melting at 245° C. (with decomposition).

EXAMPLE 26

14.9 grams of trans-4-chloro-6,8-(para-chlorophenyl)-(para-fluorophenyl)-5,6-dihydro - 8H-thiopyrano[4′,3′:4,5]thieno[2,3-d]pyrimidine are dissolved in 500 ml. of absolute toluene with heating and heated to the boil for 3 hours with 6.6 g. of β-(dimethylamino)-ethylamine with stirring. The reaction mixture is then evaporated to dryness in vacuo and the residue treated with water. By triturating the resulting resin with ethanol and recrystallization from absolute ethanol there is obtained trans-4-(β-dimethylaminoethylamino) - 6,8-(para-chlorophenyl)-(para-fluorophenyl)-5,6 - dihydro-8H-thiopyrano[4′,3′:4,5]thieno[2,3-d]pyrimidine in the form of crystals melting at 186–188° C.

By dissolving the base in the calculated quantity of N-ethanolic hydrochloric acid with heating and the addition of isopropyl ether until crystallization sets in there is obtained the dihydrochloride melting at 235° C. (with decomposition).

The trans- and cis-4-chloro-6,8-(para-chlorophenyl)-(para-fluorophenyl)-5,6-dihydro-8H - thiopyrano[4′,3′:4,5]thieno[2,3-d]pyrimidine, respectively, used as starting material may be prepared, for example as follows:

A mixture of 18 g. of para-chlorobenzalacetone and 12.4 g. of para-fluorobenzaldehyde in 50 ml. of ethanol is added to a solution of 10 g. of sodium hydroxide in a mixture of 150 ml. of water and 80 ml. of ethanol with stirring in the course of 20 minutes. Stirring is continued for one hour at room temperature, the resulting precipitate is filtered with suction and thoroughly washed with water. By recrystallization from ethanol there is obtained 1-(para-chlorophenyl) - 5 - (parafluorophenyl)-penta-1,4-dien-3-one in the form of yellow crystals melting at 163–165° C.

100 grams of 1-(para-chlorophenyl)-5-(para-fluorophenyl)-penta-1,4-dien-3-one and 100 g. of anhydrous sodium acetate are heated at the boil in 3 liters of ethanol of 90% strength with stirring. By introducing a stream of hydrogen sulphite gas for 6 hours and then adding 3 litres of water while cooling and after recrystallization from ethanol there is obtained 2-(para-chlorophenyl)-6-(para-fluorophenyl)-2,3,5,6 - tetrahydro - thiopyrane-4-one melting at 124–126° C.

43 grams of 2-(para-chlorophenyl) - 6 - (para-fluorophenyl) - 2,3,5,6 - tetrahydro-thiopyrane - 4 - one, 15.2 g. of ethyl cyanoacetate, 4.3 g. of powdered sulphur and 13 ml. of morpholine are suspended in 200 ml. of absolute ethanol and stirred for 6 hours in a bath at 50° C. and then allowed to stand for 10 hours at room temperature. The reaction mixture is evaporated to dryness in vacuo and the oily residue is made to solidify by trituration with water. After recrystallization from ethanol there is obtained 2 - amino - 3 - carbethoxy - 5,7 - (para-chlorophenyl)-(para-fluorophenyl) - 4,5 - dihydro - 7H - thieno-[2,3-c]thiopyrane melting at 168–170° C.

10 grams of 2-amino - 3 - carbethoxy - 5,7 - (para-chlorophenyl)-(para-fluorophenyl) - 4,5 - dihydro - 7H-thieno[2,3-c]thiopyrane are heated with 100 ml. of formamide under nitrogen for 6 hours in an oil bath of 185–190° C. After cooling, the reaction product is filtered with suction and recrystallized from 100 ml. of ethanol to yield 4-hydroxy - 6,8 - (para-chlorophenyl)-(para-fluorophenyl) - 5,6 - dihydro - 8H - thiopyrano[4′,3′:4,5]thieno[2,3-d]pyrimidine melting at 228–230° C.

40 grams of 4 - hydroxy - 6,8 - (para-chlorophenyl)-(para-fluorophenyl) - 5,6 - dihydro - 8H - thiopyrano[4′,3′:4,5]thieno[2,3-d]pyrimidine are heated with 400 ml. of phosphorus oxychloride for 2 hours in an oil bath of 120° C. The excess phosphorus oxychloride is then evaporated in vacuo and the residue treated with ice-water. The solid precipitate is filtered with suction, washed with water and after drying triturated with 200 ml. of ethanol. The resulting product is dissolved in 10 times its volume of a mixture of chloroform and isopropyl ether (1:2) and chromatographed on a column with 150 times the quantity of silica gel. The batch is eluted with a mixture of 4 parts of isopropyl ether and 1 part of chloroform and the separation is continuously observed by means of thin-layer chromatography. By triturating the appropriate eluates with absolute ethanol there are obtained trans-4-chloro - 6,8 - (para-chlorophenyl)-(para-fluorophenyl) - 5,6 - dihydro - 8H - thiopyrano[4′,3′:4,5]thieno[2,3-d]pyrimidine melting at 157–160° C. and the corresponding cis-stereoisomer melting at 149–153° C.

EXAMPLE 27

Tablets, each containing 100 mg. of the active substance, can be prepared, for example, from the following ingredients:

| Composition: | Per tablet, mg. |
| --- | --- |
| 4 - (β - dimethylaminoethylamino) - 6,8 - bis-(parachlorophenyl) - 5,6 - dihydro - 8H - thiopyrano[4′,3′:4,5] - thieno[2,3 - d]pyrimidine dihydrochloride | 100 |
| Lactose | 50 |
| Wheat starch | 74 |
| Colloidal silicic acid | 13 |
| Talc | 12 |
| Magnesium stearate | 1 |
| | 250 |

Preparation

4 - (β-dimethylaminoethylamino) - 6,8 - bis - (para-chlorophenyl) - 5,6 - dihydro - 8H - thiopyrano[4′,3′:4,5]thieno[2,3-d]pyrimidine dihydrochloride is mixed with the lactose, part of the wheat starch and with colloidal silicic acid, and the mixture forced through a sieve. Another portion of the wheat starch is pasted on a water bath with five times its quantity of water, and the powder mixture kneaded with the resulting paste until a slightly plastic mass is obtained. This mass is pressed through an approx. 3 mm. mesh sieve, dried and the resulting dry granulate passed through a sieve. The remainder of the wheat starch, the talc and the magnesium stearate are then admixed and the resulting mixture compressed into scored tablets each weighing 250 mg.

Tablets of this kind are suitable especially for therapeutic application.

EXAMPLE 28

Tablets, each containing 10 mg. of active principle, can be prepared, for example, from the following ingredients:

Composition: Per tablet, mg.
4 - ($\beta$-dimethylaminoethylamino)-6,8-bis(para-chlorophenyl)-5,6-dihydro - 8H - thiopyrano-[4',3':4,5]thieno[2,3 - d]pyrimidine dihydrochloride _____ 10.0
Wheat starch _____ 29.5
Lactose _____ 50.0
Colloidal silicic acid _____ 5.0
Talc _____ 5.0
Magnesium stearate _____ 0.5
                                          ─────
                                          100.0

Preparation 4-($\beta$ - dimethylaminoethylamino)-6,8-bis-(para chlorophenyl) - 5,6 - dihydro-8H-thiopyrano[4',3':4,5]thieno-[2,3-d]-pyrimidine dihydrochloride is mixed with part of the wheat starch, with lactose, and with colloidal silicic acid, and the mixture forced through a sieve. Another portion of the wheat starch is pasted on a water bath with five times its quantity of water, and the powder mixture kneaded with the resulting paste until a slightly plastic mass is obtained. This mass is pressed through an approx. 3 mm. mesh sieve, dried, and the resulting dry granulate passed through a sieve. The remainder of the wheat starch, the talc and the magnesium stearate are then admixed and the resulting mixture compressed into tablets each weighing 100 mg.

Tablets of this kind are suitable especially for prophylactic administration.

What is claimed is:

1. A member selected from the group consisting of compounds of the formula

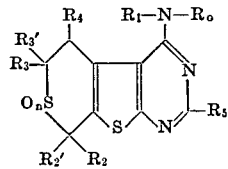

in which $n$ stands for an integer from 0 to 2, $R_o$ stands for the group of the formula

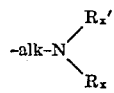

alk stands for lower alkylene, $R_x$ and $R_x'$ each stands for a member selected from the group consisting of hydrogen and lower alkyl and, when taken together with the nitrogen atom, for a member selected from the group consisting of pyrrolidino, piperidino, C-lower alkylated pyrrolidino, C-lower alkylated piperidino, $\beta$-monounsaturated pyrrolidino, $\beta$-monounsaturated piperidino, $\beta$-monounsaturated C-lower alkylated pyrrolidino, $\beta$-monounsaturated C-lower alkylated piperidino, N'-lower alkyl piperazino, N'-(hydroxy-lower alkyl)-piperazino, thiomorpholino, morpholino, C-lower alkylated N'-lower alkyl-piperazino, C-lower alkylated N'-(hydroxy-lower alkyl)-piperazino, C-lower alkylated thiomorpholino, C-lower alkylated morpholino, piperazino and C-lower alkylated piperazino, $R_1$ and $R_4$ stands for a member selected from the group consisting of lower alkyl and hydrogen, $R_2'$ and $R_3'$ represent hydrogen atoms, and $R_2$ and $R_3$ each stands for a group of the formula

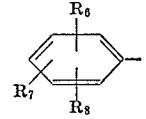

$R_6$, $R_7$ and $R_8$ each representing a member selected from the group consisting of hydrogen, lower alkyl, lower alkoxy, halogen and trifluoromethyl, $R_5$ stands for a member selected from the group consisting of hydrogen, lower alkyl, lower alkenyl, lower cycloalkyl, lower cycloalkyl-lower alkyl, phenyl-lower alkyl, lower alkyl-phenyl-lower alkyl, lower alkoxy-phenyl-lower alkyl, methylenedioxy-phenyl-lower alkyl, halogeno-phenyl-lower alkyl and trifluoromethyl-phenyl-lower alkyl, and their therapeutically acceptable acid addition salts.

2. A product as claimed in claim 1, in which $R_o$ stands for the group of the formula

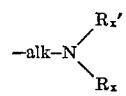

alk stands for lower alkylene, $R_x$ and $R_x'$ each for a member selected from the group consisting of hydrogen and lower alkyl and, when taken together with the nitrogen atom, for a member selected from the group consisting of pyrrolidino, piperidino, C-lower alkylated pyrrolidino, C-lower alkylated piperidino, $\beta$-monounsaturated pyrrolidino, $\beta$-monounsaturated piperidino, $\beta$-monounsaturated C-lower alkylated pyrrolidino, $\beta$-monounsaturated C-lower alkylated piperidino, N'-lower alkyl piperazino, morpholino, N'-(hydroxy-lower alkyl)-piperazino, thiomorpholino, C-lower alkylated N'-lower alkylpiperazino, C-lower alkylated N'-(hydroxy-lower alkyl)-piperazino, C-lower alkylated thiomorpholino, C-lower alkylated morpholino, piperazino and C-lower alkylated piperazino, $R_1$, $R_4$ and $R_5$ each stands for a member selected from the group consisting of hydrogen and lower alkyl, $R_2'$ and $R_3'$ represent hydrogen atoms, and $R_2$ and $R_3$ each stands for a group of the formula

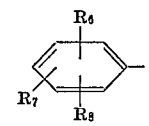

$R_6$, $R_7$ and $R_8$ each representing a member selected from the group consisting of hydrogen, lower alkyl, lower alkoxy, halogen and trifluoromethyl.

3. A product as claimed in claim 2, in which $R_1$ stands for hydrogen and $R_o$ for di-lower alkylamino-lower alkyl.

4. A product as claimed in claim 3 in which $R_4$ stands for hydrogen and $n$ for 0.

5. A product as claimed in claim 4, in which $R_5$ stands for hydrogen and $R_2$ and $R_3$ each stands for a member selected from the group consisting of para-fluorophenyl, para-chlorophenyl and para-bromophenyl and $R_o$ for a member selected from the group consisting of di-lower alkylamino-ethyl and di-lower alkylamino-propyl.

6. A product as claimed in claim 1, in which $R_1$, $R_2'$, $R_3'$, $R_4$ and $R_5$ stand for hydrogen atoms, $n$ stands for 0, $R_2$ and $R_3$ each stands for para-chlorophenyl and $R_o$ for a member selected from the group consisting of $\beta$-diethylaminoethyl,
$\beta$-dimethylaminoethyl,
$\gamma$-diethylaminopropyl,
$\gamma$-dibutylaminopropyl,
$\beta$-morpholinoethyl and
4-diethylamino-1-methylbutyl.

7. A product as claimed in claim 1, in which $R_1$, $R_2'$, $R_3'$, $R_4$ and $R_5$ stand for hydrogen atoms, $n$ stands for 0, $R_2$ and $R_3$ each stands for a member selected from the group consisting of phenyl, para-chlorophenyl, p-tolyl, p-methoxyphenyl, 3,4,5-trimethoxyphenyl, p-fluorophenyl, o-chlorophenyl, m-chlorophenyl and 2,4-dichlorophenyl and $R_0$ stands for β-diethylaminoethyl.

8. A product as claimed in claim 1, which product is the cis-4-(β-diethylaminoethylamino)-6,8-diphenyl-5,6-dihydro - 8H-thiopyrano[4',3':4,5]thieno[2,3-d]pyrimidine or an acid addition salt thereof.

9. A product as claimed in claim 1, which product is the trans-4-(β-diethylaminoethylamino)-6,8-diphenyl-5,6-dihydro - 8H - thiopyrano[4',3':4,5]thieno[2,3-d]pyrimidine or an acid addition salt thereof.

10. A product as claimed in claim 1, which product is the 4-(4-diethylamino-1-methyl-butylamino)-6,8-diphenyl - 5,6 - dihydro - 8H-thiopyrano[4',3':4,5]thieno[2,3-d] pyrimidine or an acid addition salt thereof.

11. A product as claimed in claim 1, which product is the 4-[N-(β-diethylaminoethyl)-ethylamino]-6,8-bis-(para - chlorophenyl) - 5,6 - dihydro - 8H - thiopyrano[4', 3':4,5]thieno[2,3-d]pyrimidine or an acid addition salt thereof.

12. A product as claimed in claim 1, in which $n$ stands for 1 or 2, $R_1$, $R_2'$, $R_3'$, $R_4$ and $R_5$ stand for hydrogen atoms, $R_2$ and $R_3$ each stands for para-chlorophenyl and $R_0$ for β-diethylaminoethyl.

13. A product as claimed in claim 1, which product is the 2-methyl-4-(β-dimethylamino-ethylamino) - 6,8 - bis-(para - chlorophenyl) - 5,6 - dihydro - 8H - thiopyrano[4', 3':4,5]thieno[2,3-d]pyrimidine or an acid addition salt thereof.

14. A product as claimed in claim 1, which product is the cis - 4 - (β - diethylaminoethylamino)-6,8-bis-(para-chlorophenyl) - 5,6 - dihydro - 8H - thiopyrano[4',3':4,5] thieno[2,3-d]pyrimidine or an acid addition salt thereof.

15. A product as claimed in claim 1, which product is the trans-4 - (β - diethylaminoethylamino)-6,8-bis-(para-chlorophenyl) - 5,6 - dihydro - 8H - thiopyrano[4',3':4,5] thieno[2,3-d]pyrimidine or an acid addition salt thereof.

16. A product as claimed in claim 1, which product is the cis - 4 - (β-dimethylamino-ethylamino)-6,8-(p-fluorophenyl) - 5,6 - dihydro - 8H - thiopyrano[4',3':4,5]thieno [2,3-d]pyrimidine or an acid addition salt thereof.

17. A product as claimed in claim 1, which product is the trans - 4 - (β - dimethylamino-ethylamino)-6,8-bis-(p-fluorophenyl) - 5,6 - dihydro - 8H - thiopyrano[4',3':4,5] thieno [2,3-d]pyrimidine or an acid addition salt thereof.

18. A product as claimed in claim 1, which product is the cis - 4 - (β-dimethylamino-ethylamino)-6,8-bis-(para-chlorophenyl) - 5,6 - dihydro - 8H - thiopyrano[4',3':4,5] thieno[2,3-d]pyrimidine or an acid addition salt thereof.

19. A product as claimed in claim 1, which product is the trans - 4 - (β - dimethylamino - ethylamino)-6,8-bis-(para - chlorophenyl) - 5,6 - dihydro - 8H - thiopyrano[4', 3':4,5]thieno[2,3-d]pyrimidine or an acid addition salt thereof.

20. A product as claimed in claim 1, which product is the cis - 4 - (β - diethylamino-ethylamino)-6,8-bis-(para-fluorophenyl) - 5,6 - dihydro - 8H - thiopyrano[4',3':4,5] thieno[2,3-d]pyrimidine or an acid addition salt thereof.

21. A product as claimed in claim 1, which product is the trans - 4 - (β-diethylamino-ethylamino)-6,8-bis-(para-fluorophenyl) - 5,6 - dihydro - 8H - thiopyrano[4',3':4,5] thieno[2,3-d]pyrimidine or an acid addition salt thereof.

22. A product as claimed in claim 1, in which $R_1$, $R_2'$, $R_3'$, $R_4$ and $R_5$ stand for hydrogen atoms, $n$ stands for 0, one of the symbols $R_2$ and $R_3$ stands for p-chlorophenyl and the other for a member selected from the group consisting of phenyl and p-fluorophenyl and $R_0$ stands for β-dimethylaminoethyl.

References Cited

UNITED STATES PATENTS 3,470,183  9/1969  Roth _____ 260—256.5

ALEX MAZEL, Primary Examiner

R. J. GALLAGHER, Assistant Examiner

U.S. Cl. X.R.

260—243 B, 251 A, 256.5 R; 424—246, 248, 251

UNITED STATES PATENT OFFICE
CERTIFICATE OF CORRECTION

Patent No. 3,706,738    Dated December 19, 1972

Inventor(s) PAUL SCHMIDT ET AL

It is certified that error appears in the above-identified patent and that said Letters Patent are hereby corrected as shown below:

Col. 32, line 2 after "-6,8-" insert -- bis- --.

Signed and sealed this 19th day of February 1974.

(SEAL)
Attest:

EDWARD M. FLETCHER, JR.
Attesting Officer

C. MARSHALL DANN
Commissioner of Patents df